(12) United States Patent
MacBeath et al.

(10) Patent No.: US 7,063,979 B2
(45) Date of Patent: Jun. 20, 2006

(54) INTERFACE BETWEEN SUBSTRATES HAVING MICROARRAYS AND MICROTITER PLATES

(75) Inventors: Gavin MacBeath, Arlington, MA (US); Jennipher Grudzien, Metamora, MI (US)

(73) Assignees: Grace Bio Labs., Inc., Bend, OR (US); President and Fellows of Harvard College, Cambridge, MA (US)

( * ) Notice: Subject to any disclaimer, the term of this patent is extended or adjusted under 35 U.S.C. 154(b) by 449 days.

(21) Appl. No.: 10/171,128

(22) Filed: Jun. 13, 2002

(65) Prior Publication Data

US 2003/0026739 A1    Feb. 6, 2003

Related U.S. Application Data

(60) Provisional application No. 60/329,253, filed on Oct. 12, 2001, provisional application No. 60/297,991, filed on Jun. 13, 2001.

(51) Int. Cl.
 *C12M 1/18* (2006.01)
 *B01L 3/00* (2006.01)

(52) U.S. Cl. .............................. 435/305.2; 435/288.4; 422/102

(58) Field of Classification Search .................. 422/99, 422/101, 102, 104; 435/288.4, 288.5, 305.1, 435/305.2
 See application file for complete search history.

(56) References Cited

U.S. PATENT DOCUMENTS

| | | | |
|---|---|---|---|
| 3,464,842 A * | 9/1969 | Werner | 428/195.1 |
| 3,726,754 A | 4/1973 | White | |
| 3,726,767 A | 4/1973 | White | |
| 3,745,091 A | 7/1973 | McCormick | |
| 3,883,398 A | 5/1975 | Ono | |
| 4,039,247 A | 8/1977 | Lawman et al. | |
| 4,299,920 A | 11/1981 | Peters | |
| 4,682,890 A | 7/1987 | De Marcaria et al. | |
| 5,192,503 A | 3/1993 | McGrath | |
| 5,424,213 A | 6/1995 | Mougin | |
| 5,571,721 A | 11/1996 | Turner | |
| 5,800,785 A | 9/1998 | Bochner | 422/101 |
| 5,972,694 A | 10/1999 | Mathus | 435/288.4 |
| 6,096,562 A | 8/2000 | Bunn et al. | |
| 6,277,629 B1 | 8/2001 | Wolf et al. | |
| 6,376,233 B1 | 4/2002 | Wolf et al. | |
| 6,426,050 B1 | 7/2002 | Pham et al. | |
| 6,436,050 B1 | 8/2002 | Garrison et al. | |
| 6,436,351 B1 | 8/2002 | Gubernator et al. | |
| 6,464,942 B1 | 10/2002 | Coffman et al. | |
| 6,485,690 B1 * | 11/2002 | Pfost et al. | 422/102 |
| 6,699,665 B1 * | 3/2004 | Kim et al. | 435/6 |

(Continued)

OTHER PUBLICATIONS

Mendoza et al., "High-throughput microarray-based enzyme-linked immunosorbent assay (ELISA)", BioTechniques 27:778-788, Oct. 1999.

(Continued)

*Primary Examiner*—Yelena G. Gakh
(74) *Attorney, Agent, or Firm*—Young & Basile, P.C.

(57) ABSTRACT

The invention describes a process for preparing a microtiter-microarray device that includes a bottomless microtiter plate attached to the first side of one or more substrates with microarrays of materials attached thereto. The microtiter plate and the one or more substrates are attached through one or more gaskets. Preferably, the microtiter plate is attached to one face of the one or more gaskets by an irreversible water-tight seal, and the first side of the one or more substrates is attached to the opposite face of the one or more gaskets by a reversible, water-tight seal.

59 Claims, 14 Drawing Sheets

U.S. PATENT DOCUMENTS

2001/0007642 A1     7/2001    Feiglin
2002/0110925 A1*   8/2002    Mansky et al. ............. 436/180
2002/0141905 A1    10/2002   Sha et al.
2002/0192811 A1* 12/2002   Pitt et al. ................. 435/297.5

OTHER PUBLICATIONS

*Secure Seal Hybridization Chambers*, Grace Bio-Labs, Inc., PO Box 228, Bend, OR 97709. Publication Date May 22, 2000.

*Culture Well, MultiSlipi & SecureSlip*, Grace Bio Bio-Labs, Inc., PO Box 228, Bend, OR 97709. Publication Date May 22, 2001.

*CultureWell, MultiWell Coverslip Cell Culture Inserts*, Bio-Labs, Inc., PO Box 228, Bend, OR 97709. Publication date 2000.

Genetix, *Hybridization Chamber*, product description, publication date unknown.

* cited by examiner

INTERFACE BETWEEN SUBSTRATES HAVING MICROARRAYS AND MICROTITER PLATES

RELATED APPLICATIONS

The present application claims priority to provisional applications U.S. Ser. No. 60/297,991, filed Jun. 13, 2001 and U.S. Ser. No. 60/329,253, filed Oct. 12, 2001 which are incorporated herein by reference in their entirety.

BACKGROUND OF THE INVENTION

Microarrays have revolutionized biology over the past ten years. As a result, instrumentation for manufacturing and reading spotted microarrays has been widely commercialized. The initial technology for spotting cDNA has now been extended to include spotting other materials, including small molecules, oligonucleotides, proteins (e.g., enzymes, antibodies, etc.), whole cells, and tissue specimens. To a large degree, the technology has now settled on a standard format; microarrays are manufactured on 25 mm by 75 mm glass slides that are 1 mm thick.

At the same time, high throughput robotics has been developed for biomedical and pharmaceutical research. In this area, instruments are designed to handle microtiter plates. These plates are approximately 85 mm by 125 mm. Wells in these plates are designed with standard spacing. A 96-well plate has twelve columns and eight rows with 9 mm spacing between the centers of adjacent wells. A 384-well plate has twenty-four columns and sixteen rows with 4.5 mm spacing between the centers of adjacent wells. A 1536-well plate has forty-eight columns and thirty-two rows with 2.25 mm spacing between the centers of adjacent wells. Pipetting and plate-washing robots are designed to handle plates of this format.

Traditionally, microarrays are processed by washing them with a single sample at a time, e.g., serum taken from a single patient. With the further extension of microarraying technology, it would be desirable to study the interaction of many different samples with a given microarray of materials. For example, one may want to screen thousands of different serum samples from patients with a microarray of 100 different antibodies. Or, one may wish to screen thousands of different small organic compounds for their ability to disrupt protein-protein interactions in a microarray of 100 different pairs of proteins. To do this, it would be valuable to use the current instrumentation for preparing and scanning microarrays in combination with the current instrumentation for processing samples in microtiter plates.

SUMMARY OF THE INVENTION

The invention describes processes and devices for combining microarrays on substrates with bottomless microtiter plates. The processes and devices described herein may be adapted for use with microarrays that are arranged on substrates made from a variety of materials. There are also no limitations on the nature of the microarrays or on the shape and dimensions of the substrates. Furthermore, the processes and devices described herein may be adapted for use with any type of bottomless microtiter plate without limitation to the size, shape, and features of the plate; the size, shape, and number of wells; or to the materials and methods used to prepare the plate.

In general, substrates having microarrays are combined with a bottomless microtiter plate through one or more perforated gaskets in such a way that the individual microarrays end up at the bottom of different wells of the plate, each separated from the other by a water-tight seal. When used in high throughput screening, the water-tight seal prevents samples present in one well from diffusing into an adjacent well. It will be appreciated that by combining microarrays with bottomless microtiter plates in this manner, the present invention allows the current instrumentation for preparing and scanning microarrays, and in particular microarrays, to be combined with the current instrumentation for processing samples in microtiter plates.

In one aspect, the present invention provides a method for preparing a microtiter-microarray device comprising: providing a bottomless microtiter plate that includes a plurality of wells; providing one or more gaskets the include a first face, a second face, and a plurality of perforations; providing one or more substrates with a plurality of microarrays of material attached thereto; adhering the bottomless microtiter plate to the first face of the one or more gaskets so that the plurality of wells are aligned with the plurality of perforations; and adhering the one or more substrates to the second face of the one or more gaskets so that the plurality of microarrays are aligned with the plurality of perforations. Preferably, an irreversible, water-tight seal is formed between the first face of the gasket and the microtiter plate while a reversible, water-tight seal is formed between the one or more substrates and the second face of the gasket. However, in certain other embodiments, an irreversible, water-tight seal is formed between both the first face of the gasket and the microtiter plate and between the one or more substrates and the second face of the gasket. Furthermore, in yet other embodiments, a reversible, water-tight seal is formed between both the first face of the gasket and the microtiter plate and between the one or more substrates and the second face of the gasket.

In another aspect, the present invention provides a microtiter-microarray device comprising a bottomless microtiter plate having a plurality of wells; one or more gaskets that include a first face, a second face, and a plurality of perforations; and one or more substrates with a plurality of microarrays of materials attached thereto, whereby the microtiter plate and the one or more substrates are attached through the one or more gaskets so that the plurality of wells, the plurality of perforations and the plurality of microarrays are aligned. Preferably, the microtiter plate is attached to the first face of the one or more gaskets by an irreversible, water-tight seal while the one or more substrates are attached to the second face of the one or more gaskets by a reversible, water-tight seal. However, in certain other embodiments, the microtiter plate is attached to the first face of the one or more gaskets by a reversible, water-tight seal and in yet other embodiments, the one or more substrates are attached to the second face of the one or more gaskets by an irreversible, water-tight seal.

In yet another aspect, the present invention provides methods of screening microarrays using the microtiter-microarray devices described herein. These methods include: providing a bottomless microtiter plate; providing one or more gaskets; providing one or more substrates with microarrays of materials attached thereto; adhering the bottomless microtiter plate to the first face of the one or more gaskets; adhering the one or more substrates to the second face of the one or more gaskets, whereby a microtiter-microarray device is formed; processing the microarrays of materials in the microtiter-microarray device to determine one or more desired characteristics of the materials; and scanning the microarrays of materials. Preferably, an irreversible, water-tight seal is formed between the first face of the one or more gaskets and the microtiter plate while a reversible, water-tight seal is formed between the one or more substrates and the second face of the one or more gaskets. However, in certain other embodiments, an irreversible, water-tight seal is formed between both the first face of the one or more gaskets and the microtiter plate and between the one or more substrates and the second face of the one or more gaskets. Furthermore, in yet other embodiments, a reversible, water-tight seal is formed between both the first face of the one or more gaskets and the microtiter plate and between the one or more substrates and the second face of the one or more gaskets. When the one or more substrates are reversibly attached to the one or more gaskets, they may be removed from the microtiter-microarray device prior to scanning. It is to be understood however, that the microarrays may also be scanned while still in the microtiter-microarray device.

In still another aspect, the present invention provides gaskets. In general, the gaskets include one or more layers of adhesive material. Preferably, the first face of the gaskets includes an irreversible adhesive material and the second face includes a reversible adhesive material. However, in certain other embodiments, the first face of the gaskets may include a reversible adhesive material and in yet other embodiments, the second face may include an irreversible adhesive material. In certain embodiments one or both faces of the gasket includes a release liner.

In other aspects, the present invention provides devices that align the microtiter plate and one or more gaskets so that the wells of the plate are aligned with the perforations of the one or more gaskets; devices that align the one or more substrates with the microtiter plate and attached gasket so that some or all of the perforations of the gasket (and hence some or all of the wells of the plate) are aligned with microarrays on the one or more substrates; devices that remove the one or more substrates from the microtiter-microarray device by breaking the seal between the one or more substrates and the one or more gaskets; and kits comprising these with or without gaskets and/or substrates having microarrays.

DEFINITIONS

Figure 1:
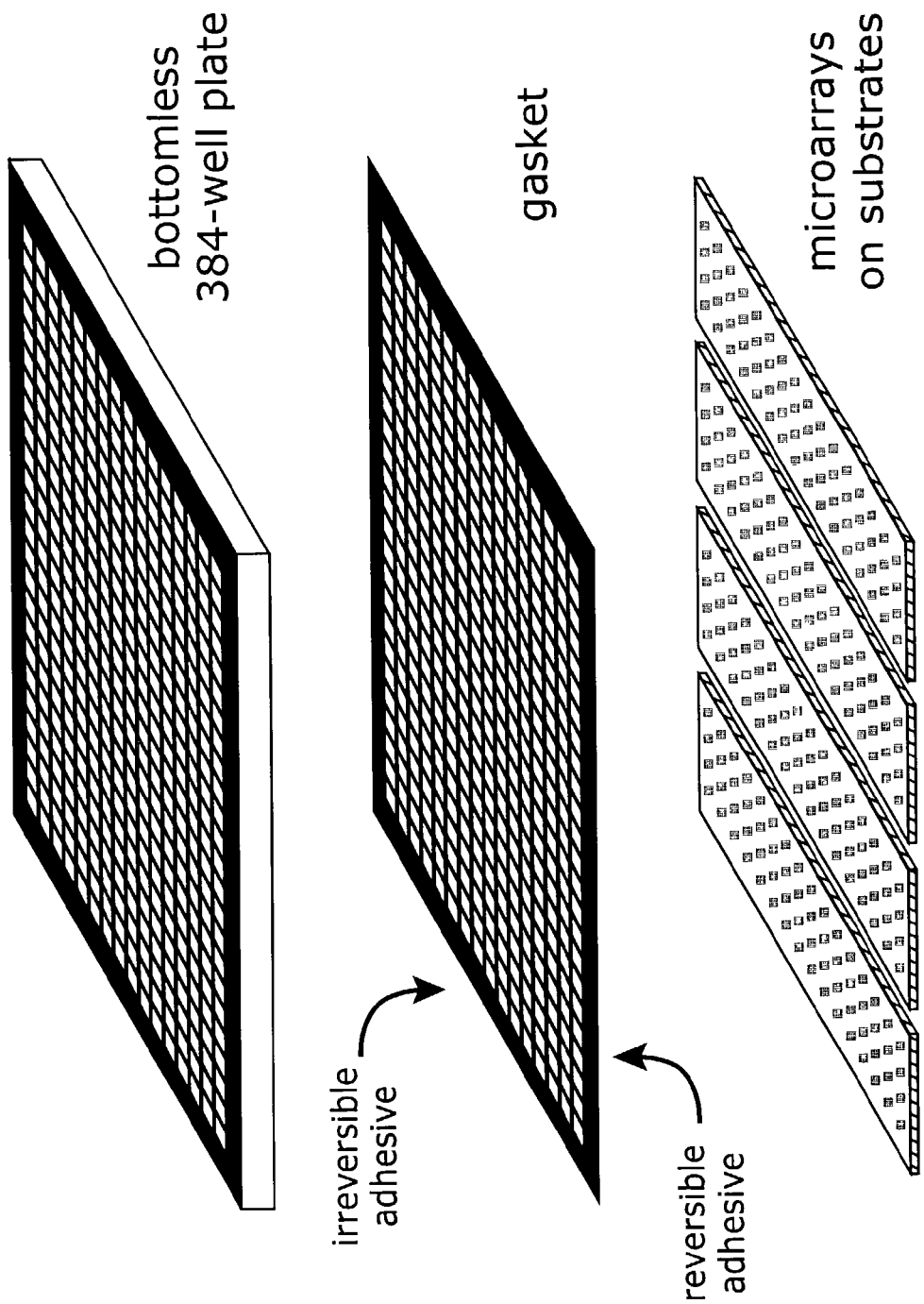
FIG. 1 depicts an inventive kit that includes a bottomless 384-well microtiter plate, a gasket, and four substrates, each with 64 microarrays of materials attached thereto.

"Biomolecule": The term "biomolecule", as used herein, refers to molecules (e.g., carbohydrates, proteins, polynucleotides, glycoproteins, lipoproteins, etc.) whether naturally-occurring or artificially created (e.g., by synthetic or recombinant methods) that are commonly found in cells. Typically, polymeric biomolecules have a molecular weight of more than about 500 g/mol, although this characterization is not intended to be limiting for the purposes of the present invention. Specific classes of biomolecules include, but are not limited to, enzymes, receptors, nucleoproteins, neurotransmitters, hormones, cytokines, cell response modifiers such as growth factors and chemotactic factors, antibodies, vaccines, haptens, toxins, interferons, ribozymes, anti-sense agents, plasmids, DNA, and RNA.

"Carbohydrate": As used herein, the term "carbohydrate" refers to a polymer of sugars. The terms "carbohydrate", "polysaccharide", and "oligosaccharide" may be used interchangeably. Typically, a carbohydrate comprises at least three sugars. The polymer may include natural sugars (e.g., glucose, fructose, galactose, mannose, arabinose, ribose, and xylose) and/or modified sugars (e.g., 2'-fluororibose, 2'-deoxyribose, and hexose).

"Irreversible adhesive": As used herein, the term "irreversible adhesive" refers to adhesives that adhere to a surface irreversibly, i.e., that cannot be stripped from the surface without transferring substantial quantities of adhesive to the surface. Permanent pressure-sensitive adhesives are irreversible adhesives of the present invention.

"Irreversible water-tight seal": As used herein, the term "irreversible water-tight seal" refers to a seal between two surfaces that does not allow more than trace amounts of water therethrough after being exposed to water for a period of minutes, hours, or preferably days and that cannot be broken without transferring substantial quantities of adhesive from one surface to the other surface.

"Protein": As used herein, the term "protein" refers to a polymer of amino acids linked together by peptide bonds. The terms "protein", "polypeptide", and "peptide" may be used interchangeably. Typically, a protein comprises at least three amino acid residues. Peptide may refer to an individual protein or a collection of proteins. Inventive proteins preferably contain only natural amino acids, although non-natural amino acids (i.e., compounds that do not occur in nature but that can be incorporated into a polypeptide chain) and/or amino acid analogs as are known in the art may alternatively be employed. Also, one or more of the amino acids in an inventive protein may be modified, for example, by the addition of a chemical entity such as a carbohydrate group, a phosphate group, a farnesyl group, an isofarnesyl group, a fatty acid group, a linker for conjugation, functionalization, or other modification, etc.

"Polynucleotide": As used herein, the term "polynucleotide" refers to a polymer of nucleotides. The terms "polynucleotide", "nucleic acid", and "oligonucleotide", may be used interchangeably. Typically, a polynucleotide comprises at least three nucleosides. The polymer may include natural nucleosides (i.e., adenosine, thymidine, guanosine, cytidine, uridine, deoxyadenosine, deoxythymidine, deoxyguanosine, and deoxycytidine), nucleoside analogs (e.g., 2-aminoadenosine, 2-thiothymidine, inosine, pyrrolo-pyrimidine, 3-methyl adenosine, 5-methylcytidine, C-5 propynyl-cytidine, C-5 propynyl-uridine, 2-aminoadenosine, C5-bromouridine, C5-fluorouridine, C5-iodouridine, C5-propynyl-uridine, C5-propynyl-cytidine, C5-methylcytidine, 2-aminoadenosine, 7-deazaadenosine, 7-deazaguanosine, 8-oxoadenosine, 8-oxoguanosine, O(6)-methylguanine, and 2-thiocytidine), chemically modified bases, biologically modified bases (e.g., methylated bases), intercalated bases, modified sugars (e.g., 2'-fluororibose, ribose, 2'-deoxyribose, arabinose, and hexose), or modified phosphate groups (e.g., phosphorothioates and 5'-N-phosphoramidite linkages).

"Reversible adhesive": As used herein, the term "reversible adhesive" refers to adhesives that can adhere to a surface reversibly, i.e., that can be stripped from the surface without transferring more than trace quantities of adhesive to the surface, and then can be readhered to the same or another surface because the adhesive retains some or all of its tack and adhesive strength. Clean-release pressure-sensitive adhesives are reversible adhesives of the present invention.

"Reversible water-tight seal": As used herein, the term "reversible water-tight seal" refers to a seal between two surfaces that does not allow more than trace amounts of water therethrough after being exposed to water for a period of minutes, hours, or preferably days and that can be broken without transferring more than trace quantities of adhesive from one surface to the other. In certain embodiments, the reversible seal is such that it can be reformed by bringing the two surfaces back together after the seal has been broken.

"Rigid material": As used herein, the term "rigid material" refers to a material that is solid and does not readily bend, i.e., the material is not flexible. As such, rigid materials are sufficient to provide physical structure to the materials present thereon under the conditions in which the material is employed, particularly under high throughput handling conditions. Examples of solid materials that are not rigid substrates with respect to the present invention include membranes, flexible plastic films, and the like. In certain situations, the rigid material may be transparent to visible and/or UV light. However, rigid materials that are opaque to visible and/or UV lights are also encompassed by the present invention. Preferred rigid materials are inert. Specific rigid materials of interest include: glass; plastics, e.g., polytetrafluoroethylene, polypropylene, polystyrene, polycarbonate, and blends thereof, and the like; metals, e.g., gold, platinum, aluminum, titanium, and the like; etc. In certain embodiments, the rigid materials are machinable and or moldable.

"Small Molecule": As used herein, the term "small molecule" refers to a non-peptidic, non-oligomeric organic compound either synthesized in the laboratory or found in nature. Small molecules, as used herein, can refer to compounds that are "natural product-like", however, the term "small molecule" is not limited to "natural product-like" compounds. Rather, a small molecule is typically characterized in that it contains several carbon-carbon bonds, and has a molecular weight of less than 1500 g/mol, although this characterization is not intended to be limiting for the purposes of the present invention. Examples of "small molecules" that occur in nature include, but are not limited to, taxol, dynemicin, and rapamycin. Examples of "small molecules" that are synthesized in the laboratory include, but are not limited to, compounds described in Tan et al., *J. Am. Chem. Soc.* 120:8565, 1998 and patent application U.S. Ser. No. 08/951,930, entitled "Synthesis of Combinatorial Libraries of Compounds Reminiscent of Natural Products", and filed Oct. 15, 1997, the entire contents of which are incorporated herein by reference.

DESCRIPTION OF CERTAIN PREFERRED EMBODIMENTS

The present application mentions various patents, scientific articles, and other publications. The contents of each such item are hereby incorporated by reference.

The invention describes processes and devices for combining microarrays on substrates with bottomless microtiter plates. In general, the substrates having microarrays and the bottomless microtiter plates are combined through one or more perforated gaskets in such a way that the individual microarrays end up at the bottom of different wells of the plates, each separated from the other by a water-tight seal. When used in high throughput screening, the water-tight seal prevents samples present in one well from diffusing into an adjacent well. It will be appreciated that by combining microarrays with bottomless microtiter plates in this manner, the present invention allows the current instrumentation for preparing and scanning microarrays to be combined with the current instrumentation for processing samples in microtiter plates.

Methods of Preparing a Microtiter-microarray Device

One embodiment of the general inventive process is illustrated in FIG. 1 and includes: providing a bottomless microtiter plate; providing a gasket; providing one or more substrates with microarrays of material attached thereto; adhering the bottomless microtiter plate to the first face of the gasket; and adhering the one or more substrates to the second face of the gasket. As illustrated in FIG. 1, preferably an irreversible, water-tight seal is formed between the first face of the gasket and the microtiter plate while a reversible, water-tight seal is formed between the one or more substrates and the second face of the gasket. However, in certain other embodiments, an irreversible, water-tight seal is formed between both the first face of the gasket and the microtiter plate and between the one or more substrates and the second face of the gasket. Furthermore, in yet other embodiments, a reversible, water-tight seal is formed between both the first face of the gasket and the microtiter plate and between the one or more substrates and the second face of the gasket.

The processes and devices described herein may be adapted for use with microarrays that are arranged on substrates made from a variety of materials. There are also no limitations on the nature of the microarrays or on the shape and dimensions of the substrates. In certain embodiments, the substrates may have the dimensions of a standard glass slide, i.e., 25 mm by 75 mm and 1 mm thickness; however, the present invention is in now way limited to rectangular substrates having these dimensions. For example, in certain preferred embodiments, the dimensions of the substrate are the same as the dimensions of the gasket, i.e., a single large substrate may be used instead of combining several small substrates. In preferred embodiments the substrates are rigid meaning that the substrates are solid and do not readily bend, i.e., the substrates are not flexible. As such, rigid substrates are sufficient to provide physical structure to the materials present thereon under the conditions in which the microarray is employed, particularly under high throughput handling conditions. Preferred, but non limiting, materials are plastic and glass. The microarrays themselves may include a variety of materials such as, but not limited to, small molecules, e.g., from a combinatorial library; biomolecules, e.g., proteins, polynucleotides, and/or carbohydrates; whole cells; and tissue specimens.

Furthermore, the processes and devices described herein may be adapted for use with any type of bottomless microtiter plate without limitation to the size, shape, and features of the plate; the size, shape, and number of wells; or to the materials and methods used to prepare the plate. Microtiter plates are typically made by injection molding, casting, machining, laser cutting, or vacuum sheet forming one or more resins. The microtiter plates may be made from transparent or opaque materials. A variety of bottomless 96-, 384-, 1536-, and 3456-well plates can be purchased commercially (e.g., from Greiner Labortechnik of Frickenhausen, Germany; Corning Life Sciences of Acton, Mass.; etc.).

While FIG. 1 illustrates the use of a single gasket, it is to be understood that the microtiter plate and the one or more substrates may be attached through more than one gasket, e.g., through 2, 3, 4, 5, 6, 7, 8, or more gaskets. For example, several gaskets may be arranged side by side, with or without intervening spacings. Alternatively or additionally, several gaskets may be arranged face to face. In general, the one or more gaskets include a plurality of perforations that are dimensioned and arranged in the same pattern as the wells (or a subset thereof) of the microtiter plate to which they are being attached. In certain embodiments, a gasket is used that includes a full set of perforations, e.g., the microtiter plate is a standard 96-, 384-, 1536-, or 3456-well plate and the perforations of the gasket are in the pattern and dimensions of the 96, 384, 1536, or 3456 wells of a 96-, 384-, 1536-, or 3456-well plate, respectively (see for example the gasket of FIG. 2A that was designed to be used with a 384-well plate). In certain other embodiments, a gasket is used that includes a subset of perforations, e.g., the microtiter plate is a standard 96-, 384-, 1536-, or 3456-well plate and the perforations of the gasket are in the pattern and dimensions of a subset of wells of a 96-, 384-, 1536-, or 3456-well plate, respectively (see for example the gasket of FIG. 2B or the gasket of FIG. 13, Panel 17). It is to be understood however that one or more inventive gaskets can be prepared for any type of bottomless microtiter plate without limitation to the size, shape, and features of the plate; the size, shape, and number of wells; or to the materials and methods used to prepare the plate. It is further to be understood that for any given microtiter plate, several gasket formats may be used and that the present invention is in no way limited to a particular gasket format.

In general, the one or more gaskets include one or more layers of adhesive material. Preferably, the first face of the one or more gaskets includes an irreversible adhesive and the second face includes a reversible adhesive. However, in certain other embodiments, the first face of the one or more gaskets may include a reversible adhesive and in yet other embodiments, the second face may include an irreversible adhesive. Any adhesive that provides an irreversible or reversible attachment between the gasket and the microtiter plate or between the one or more substrates and the gasket may be used according to the present invention. In certain embodiments, the gaskets include one or more layers of adhesive material laminated together to achieve an appropriate thickness, e.g., but not limited to 0.25 to 3 mm. For example, the gaskets may include one or more layers of a double-sided pressure-sensitive adhesive (PSA) tape. Any double-sided PSA that is known now or later discovered and that provides an irreversible or reversible, water-tight seal between the gasket and the microtiter plate or between the one or more substrates and the gasket may be used according to the present invention including, but not limited to double-sided PSAs that include acrylic and/or silicone adhesives.

A variety of double-sided PSAs that include acrylic and silicone adhesives are available commercially. The properties of these and other adhesives are described in a variety of commercial manuals, e.g., "*3M Designer's Reference Guide to Adhesive Technology*" and "*3M Manual of Double Coated Tapes, Adhesive Transfer Tapes and Reclosable Fasteners*" both from 3M of St. Paul, Minn., see also the adhesives described in "*Adhesion and Bonding*", Encyclopedia of Polymer Science and Engineering, Vol. 1, pp. 476–546, Interscience Publishers, 1985.

As is well known in the art, silicone adhesives generally form reversible, water-tight seals with plastic and glass surfaces. Silicone adhesives are therefore particularly useful in producing reversible, water-tight seals between inventive gaskets and glass substrates and/or plastic microtiter plates. It will be appreciated that a similar result may be obtained by using one of a variety of clean-release acrylic adhesives that bond reversibly with certain plastic and glass surfaces, e.g., 3M® #9425, from 3M of St. Paul, Minn. and ARcare® #8651 from Adhesives Research of Glen Rock, Pa. Permanent acrylic adhesives may be used to produce an irreversible, water-tight seal between inventive gaskets and glass substrates and/or plastic microtiter plates. A variety of permanent acrylic adhesives that produce irreversible seals with a variety of surfaces (e.g., glass, plastics, silicone, etc.) are also available commercially, e.g., 3M® #8142 from 3M and ARcare® #8175 from Adhesives Research both bond irreversibly with glass surfaces and plastic surfaces.

Preferred gaskets of the present invention include on one face an adhesive (e.g., a silicone adhesive) that forms a reversible, water-tight seal with a glass surface and on the opposite face an adhesive that forms an irreversible, water-tight seal with a plastic surface (e.g., a permanent acrylic adhesive). Exemplary, but non limiting, silicone/acrylic double-sided PSA tapes that may be used for this purpose include 3M® #9731, from 3M and ARclad® #8026, from Adhesives Research.

It is to be understood that the methods of the present invention are not limited to using silicone and/or acrylic double-sided PSAs and that one could use other adhesives, e.g., foam tape scotch brands such as 3M® VHB® #4926 from 3M; epoxy adhesives or liquid adhesives which can be dispensed and allowed to cure at room temperature or by heating, as well as UV curable silicones or RTV silicones (room temperature vulcanization silicones), e.g., those from Loctite of Rocky Hill, Conn. In certain embodiments, spray-on adhesives could also be used, in particular, a gasket could be molded or cast directly onto a microtiter plate whereby perforations in the gasket are produced by alignment with cavities in the mold and the bond to the plate is produced by the process of molding or casting.

In certain preferred embodiments, the gaskets include one or more layers of a non-porous compressible material, such as but not limited to silicone. In certain embodiments, the layer of non-porous compressible material may be directly adhered to one or more substrates having microarrays or to a microtiter plate, i.e., without the use of an adhesive. According to such embodiments, the compressible material may be treated to enhance the binding properties to the one or more substrates having microarrays or to a microtiter plate, e.g., by treatment with a chemical adhesion promoter or primer known in the art (e.g., the PRISM products from Loctite of Rocky Hill, Conn. and the PRONTO Surface Activator from 3M). In certain other embodiments, an inventive gasket may be prepared by applying one or more adhesive layers on the first and/or second face of the compressible material, thereby forming a "sandwich" structure. In certain embodiments, the compressible material may be treated to enhance the binding properties to the adhesive layer, e.g., by treatment with a chemical adhesion promoter or primer known in the art (e.g., the PRISM products from Loctite of Rocky Hill, Conn. and the PRONTO Surface Activator from 3M). When the compressible material is a layer of silicone, it will be also appreciated that other treatments can be applied to enhance bonding between the gasket and the microtiter plate, e.g., UV curable liquid silicone could be dispensed onto the surface of the silicone layer and after application to the plate exposed to UV to form a bond. Generally, silicone adhesives form an irreversible seal with silicone and double-sided PSAs that include a silicone adhesive may therefore be used in preparing a gasket of the present invention that includes a layer of silicone "sandwiched" between two layers of double-sided PSA tape.

In certain preferred embodiments, the step of adhering the bottomless microtiter plate to the first face of the one or more gaskets is preceded by a step of aligning the bottomless microtiter plate with the one or more gaskets. The aligning step may be performed manually or more preferably using a first aligning device. Any device that aligns the plate and one or more gaskets may be used according to the present invention. In certain preferred embodiments the first aligning device aligns the plate and one or more gaskets so that the wells of the plate are aligned with the perforations of the one or more gaskets. For example, the first aligning device may include a rigid material with a plurality of protrusions that are dimensioned and arranged to fit within the perforations of the one or more gaskets. Generally, a snug fit is obtained between the protrusions and the perforations when the width or diameter of the protrusions is between about 80 and 100%, preferably between about 85 and 98%, more preferably between about 90 and 97% of the width or diameter of the perforations. In certain embodiments, the protrusions are taller than the one or more gaskets are thick, e.g., at least 25, 50, 100, 200, or 500% taller. According to such embodiments, the one or more gaskets are first placed over the plurality of protrusions so that the protrusions fit within the perforations of the one or more gaskets. The microtiter plate is then placed over the plurality of protrusions so that the protrusions also fit within the wells of the microtiter plate. In these and other embodiments, the first aligning device may further include one or more features that are dimensioned and arranged to accommodate or fit within one or more complementary features of the microtiter plate. For example, the plurality of protrusions may be located within a chamber that is dimensioned to fit around the outer walls of the microtiter plate. Additionally, the first aligning device may include a peripheral depression which is designed to accommodate the perimeter of the microtiter plate. Alternatively, the first aligning device may include a plurality of peripheral columns that are designed to fit into holes present in the perimeter of the microtiter plate. It is to be understood that the present invention is not limited to any particular combination of complementary features and that any combination sufficient to align the microtiter plate with the one or more gaskets is encompassed by the present invention.

Preferably, the step of adhering the one or more substrates to the one or more gaskets is also preceded by a step of aligning the one or more substrates with the microtiter plate and attached gasket or gaskets. The aligning step may be performed manually or more preferably using a second aligning device. Any device that aligns the one or more substrates with the microtiter plate and attached gasket or gaskets may be used according to the present invention. In certain preferred embodiments the second aligning device aligns the one or more substrates with the microtiter plate and attached gasket or gaskets so that the perforations of the gasket or gaskets (and hence the wells of the plate) are aligned with the microarrays on the one or more substrates. For example, the second aligning device may include a rigid material with one or more casings that are shaped and dimensioned to accommodate a substrate. According to such embodiments, the one or more substrates are first placed into the one or more casings. The microtiter plate and attached gasket or gaskets are then placed over the one or more substrates so that they adhere. In these embodiments, the second aligning device preferably also includes one or more features that are dimensioned and arranged to accommodate or fit within one or more complementary features of the microtiter plate so that the microarrays on the substrates can be properly and accurately aligned with the wells of the microtiter-microarray device.

Microtiter-microarray Device

The present invention also provides a microtiter-microarray device comprising a bottomless microtiter plate; one or more gaskets; and one or more substrates with microarrays of materials attached thereto, whereby the microtiter plate and the one or more substrates are attached through the one or more gaskets. Preferably, the microtiter plate is attached to the first face of the one or more gaskets by an irreversible, water-tight seal while the one or more substrates are attached to the second face of the one or more gaskets by a reversible, water-tight seal. However, in certain other embodiments, the microtiter plate is attached to the first face of the one or more gaskets by a reversible, water-tight seal and in yet other embodiments, the one or more substrates are attached to the second face of the one or more gaskets by an irreversible, water-tight seal.

Microarrays

The microarrays of the present invention may include a variety of materials including but not limited to small molecules, e.g., a combinatorial library; biomolecules, e.g., proteins, polynucleotides, and/or carbohydrates; whole cells; and tissue specimens. The materials are preferably stably associated with the surface of a substrate. By stably associated is meant that the materials maintain their position relative to the substrate under conditions of use, e.g., high throughput screening. As such, the materials can be non-covalently or covalently associated with a substrate surface. Examples of suitable non-covalent associations include non-specific adsorption, specific binding through a specific binding pair member covalently attached to a substrate surface, and entrapment in a matrix material, e.g., a hydrated or dried separation medium. Examples of suitable covalent associations include covalent bonds formed between small molecules or biomolecules and a functional group present on a surface of the substrate, where the functional group may be naturally occurring or present as a member of an introduced linking group, as described in greater detail below.

The substrates of the subject microarrays may be fabricated from a variety of materials. In preferred embodiments the substrate is rigid meaning that the substrate is solid and does not readily bend, i.e., the substrate is not flexible. As such, rigid substrates are sufficient to provide physical structure to the materials present thereon under the conditions in which the microarray is employed, particularly under high throughput handling conditions. Examples of solid materials that are not rigid substrates with respect to the present invention include membranes, flexible plastic films, and the like. Preferably, the materials from which the substrate is fabricated exhibit a low level of non-specific binding of target sample under the conditions of the assay. In many situations, it will also be preferable to employ a material that is transparent to visible and/or UV light. Specific materials of interest include: glass; plastics, e.g., polytetrafluoroethylene, polypropylene, polystyrene, polycarbonate, and blends thereof, and the like; metals, e.g., gold, platinum, and the like; etc.

The substrate of the subject microarrays comprises at least one surface on which microarrays of materials are present, where the surface may be smooth or substantially planar, or have irregularities, such as depressions or elevations. The surface on which the microarrays of materials are presented may be modified with one or more different layers of compounds that serve to modulate the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include inorganic and organic layers such as metals, metal oxides, polymers, small organic molecules and the like. Polymeric layers of interest include layers of proteins, polynucleotides or mimetics thereof, e.g., peptide nucleic acids and the like; polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto, e.g., conjugated.

The concentration of the material spots on the surface of the substrate is selected to provide for adequate sensitivity of binding events with a target sample, where the concentration will generally range from about 1 to 100 $ng/mm^2$, usually from about 5 to 50 $ng/mm^2$ and more usually from about 10 to 30 $ng/mm^2$. The microarrays may comprise a plurality of different materials or sets of materials each arranged within a distinct spot of each microarray. The number of distinct spots in a subject microarray is at least 5, usually at least 8, and may be much higher. In some embodiments, the microarrays have at least 10 distinct spots, usually at least about 20 distinct spots, and more usually at least about 50 distinct spots, where the number of spots may be as high as 5,000 or higher, but will usually not exceed about 1,000 distinct spots, and more usually will not exceed about 500 distinct spots. Generally, the spots will have a diameter of between about 100 µm and about 2 mm, preferably between about 100 µm and 1 mm, more preferably between about 100 and 500 µm, most preferably between about 100 and 250 µm. The spots may be microarrayed at a density of at least about 5 per $cm^2$ and usually at least about 10 per $cm^2$ but does not exceed about 500 per $cm^2$, and usually does not exceed about 250 per $cm^2$, and more usually does not exceed about 100 per $cm^2$. In certain embodiments the spots within a given microarray include the same material. In other embodiments each spot includes a different material. It is further to be understood that the different microarrays on a particular substrate may be the same or different. Generally, a given substrate may include any number of individual microarrays arranged thereon. The centers of the microarrays are spaced and arranged according to the arrangement of perforations on the gasket (and hence in most occasions, the arrangement of wells in the microtiter plate). It is to be understood that the substrates need not include a microarray at each and every location on the substrate that corresponds with a perforation and well. Indeed, in certain embodiments it may prove advantageous to leave one or more of the wells of an inventive microtiter-microarray device unoccupied, e.g., as described in greater detail below, a protrusion can then be inserted into the unoccupied well in order to apply pressure onto the substrate and hence break the seal between the substrate and gasket.

The substrates upon which the subject patterns of materials are preferably presented may take a variety of configurations. Thus, the substrate could have an overall slide or plate configuration, such as a rectangular or disc configuration, where an overall rectangular configuration, as found in standard microarrays and microscope slides, is preferred. For example, the length of the substrates may be at least about 10 mm and may be as great as 400 mm or more, but usually does not exceed about 300 mm and may often not exceed about 150 mm. The width of the substrate may be at least about 10 mm and may be as great as 300 mm, but usually does not exceed 200 mm and often does not exceed 100 mm. The thickness of the substrate will generally range from 0.01 mm to 10 mm, depending at least in part on the material from which the substrate is fabricated and the thickness of the material required to provide the requisite rigidity. In certain preferred embodiments, the substrate is a 25 mm by 75 mm glass slide that is about 1 mm thick; however, the present invention is in now way limited to rectangular substrates having these dimensions. For example, in certain preferred embodiments, the dimensions of the substrate are the same as the dimensions of the gasket, i.e., a single large substrate may be used instead of combining several small substrates.

Substrates that include a variety of microarrays of materials arranged thereon are available commercially (e.g., from Affymetrix of Santa Clara, Calif.; TeleChem International of Sunnyvale, Calif.; BD Biosciences Clontech of Palo Alto, Calif.; Genomic Solutions of Ann Arbor, Mich.; etc.). Furthermore, a variety of methods for preparing microarrays of small molecules, biomolecules, whole cells, and tissue samples are known in the art. In particular, in addition to the well known techniques for preparing microarrays of polynucleotides (see, for example, Cheung et al., *Nature Genetics* 21(Supp.):15, 1999; *Microarray Biochip Technology*, Ed. by Mark Schena, Eaton Publishing Co., 2000 and *DNA microarrays: Technologies and Experimental Strategies*, Ed. by Elena Grigorenko, CRC Press, 2001) a variety of techniques have recently been developed that enable small molecules, proteins, carbohydrates, whole cells, and tissue samples to be microarrayed on the surface of substrates such as glass and plastic slides.

With regards to small molecules, MacBeath et al. have described methods of preparing glass slides that display maleimide groups on their surface (MacBeath et al., *J. Am. Chem. Soc.* 121:7967, 1999). Thiol-labeled compounds attach readily to the surface of these glass slides via a Michael addition reaction to form a thioether linkage. More recently, Hergenrother et al. described the preparation of silylchloride slides that enable the attachment of compounds displaying primary alcohols (Hergenrother et al., *J. Am. Chem. Soc.* 122:7849, 2000). Other linkages that can be employed in the preparation of a microarray of small molecules include, but are not limited to disulfide bonds, amide bonds, ester bonds, ether bonds, hydrazone linkages, carbon-carbon bonds, metal ion complexes, and non-covalent linkages mediated by, for example, hydrophobic interactions or hydrogen bonding. In certain preferred embodiments, coupling of acids and amines, coupling of aldehydes and hydrazide, coupling of trichlorocyanuric acid and amines, addition of amines to quinones, attachment of thiols to mercury, addition of sulfhydryls, amines, and hydroxyls to open bis-epoxides, photoreactions of azido compounds to give insertions via a nitrene intermediate, or coupling of diols to boronate is used in the preparation of the inventive small molecule microarrays. The attachment of small molecules to substrates using a Michael addition or a silylation reaction is described in patent application U.S. Ser. No. 09/567,910, entitled "Small Molecule Printing" and filed May 10, 2000; incorporated herein by reference. As will be appreciated by one of ordinary skill in the art, the use of split-and-pool libraries enables the more efficient generation and screening of compounds (see, for example, Furka et al., *Int. J. Pept. Protein Res.* 37:487, 1991 and Sebestyen et al., *Bioorg. Med. Chem. Lett.* 3:413, 1993). However, small molecules synthesized by parallel synthesis methods and by traditional methods (one-at-a-time synthesis and modifications of these structures) can also be utilized in the microarrays of the present invention, as can naturally occurring compounds.

A variety of methods for microarraying proteins have also been reported. Some of these techniques do not preserve the folded conformation of the protein and are therefore unsuitable when the native function of the proteins is being assayed (see, for example, Bussow et al., *Nucleic Acids Res.* 26:5007, 1998; Lueking et al., *Anal. Biochem.* 270:103, 1999; and Mendoza et al., *Biotechniques* 27:778, 782, 788, 1999). Others have described the immobilization of proteins in ways that preserve their native structure and hence their function (see, Arenkov et al., *Anal. Biochem.* 278:123, 2000 and MacBeath and Schreiber, *Science* 289:1760, 2000). Arenkov et al. use microfabricated polyacrylamide gel pads to capture proteins and then accelerate diffusion through the matrix by microelectrophoresis. MacBeath and Schreiber use chemically derivatized glass slides to covalently link the proteins to the glass slides (described in U.S. Ser. No. 09/923,243, entitled "Protein Microarrays", and filed Aug. 3, 2001; incorporated herein by reference). For example, glass slides that have been treated with an aldehyde-containing silane reagent (from Telechem International of Sunnyvale, Calif. under the trade name "SuperAldehyde Substrates") were shown to react readily with the primary amines of proteins to form a Schiffs base linkage. Because typical proteins display many lysines on their surface as well as the generally more reactive alpha-amine at their amino termini, they can attach to the slide in a variety of orientations, permitting different sides of the protein to interact with other proteins or small molecules in the test sample. Following attachment of the proteins to these slides, the unreacted aldehydes are quenched and nonspecific binding is minimized by immersing the slides in a buffer containing bovine serum albumin (BSA). Although appropriate for most applications, aldehyde slides cannot be used when peptides or very small proteins are printed, presumably because the BSA obscures these small proteins. For such applications, BSAN-hydroxysuccinimide (BSA-NHS) slides that are fabricated by first attaching a molecular layer of BSA to the surface of glass slides and then activating the BSA with N,N'-disuccinimidyl carbonate may be used. The activated lysine, aspartate, and glutamate residues on the BSA react readily with surface amines on the proteins to form covalent urea or amide linkages. The glass slides are then quenched with glycine. In contrast to the aldehyde slides, proteins printed on BSA-coated slides are displayed on top of the BSA monolayer, rendering them accessible to proteins and small molecules in the test sample. It will be appreciated by one of ordinary skill in the art that a variety of other chemically derivatized glass slides may be used to prepare protein microarrays, including but not limited to, epoxide slides, N-hydroxysuccinimide-ester slides, Ncarboxyimidazole slides, etc. Glass slides with either nitrocellulose or nylon membranes adhered to their surface may also be used (e.g., those from Schleicher & Schuell of Keene, N.H.); as may glass slides with hydrogel coatings, in particular hydrogels that have been derivatized for covalent coupling of proteins (e.g., those from Motorola BioChip Systems of Northbrook, Ill. and Perkin Elmer Life Sciences of Boston, Mass.; NoAb Biodiscoveries of Mississauga, Canada sells hydrogel-N-hydroxysuccinimide slides, hydrogel-aldehyde slides, and hydrogel-epoxide slides).

Wang et al. have described methods for preparing carbohydrate microarrays (Wang et al., *Nat. Biotechnol.* 20:275, 2002). In particular, they were able to immobilize microbial polysaccharides on a nitrocellulose coated glass slide without chemical conjugation. Ziauddin and Sabatini have described methods for preparing a microarray of mammalian cells on a glass slide printed in defined locations with different DNAs (Ziauddin and Sabatini, *Nature* 411:107, 2001). Cells growing on the printed areas take up the DNA, creating spots of localized transfection within a lawn of non-transfected cells. By printing sets of complementary DNAs cloned in expression vectors, microarrays were made whose features are clusters of live cells that express a defined cDNA at each location. A variety of tissue microarrays have also been prepared from morphologically representative regions of regular formalin-fixed paraffin-embedded tumor blocks (see, for example, Kononen et al., *Nature Medicine* 4:844, 1998; Moch et al., *Am. J. Pathol.* 154:981, 1999; and Bubendorf et al., *J. Natl. Cancer Inst.* 91:1758, 1999). More recently, Fejzo and Slamon have described the preparation of frozen tumor tissue microarrays (Fejzo and Slamon, *Am. J. Path.* 59:1645, 2001). In the paraffin-embedded technique, core tissue biopsies are taken from individual paraffin blocks and microarrayed into a new paraffin block at defined microarray coordinates using a tissue microarraying instrument (from Beecher Instruments of Silver Spring, Md.). Using this technique, up to 1000 or more tissue samples can be combined into a single paraffin block. After the block has been constructed, 5 to 8 μm sections of the resulting tumor tissue microarray block can be cut with a microtome and then adhered on a glass slide before being processed. Tissue microarrays permit high-volume simultaneous analysis of molecular targets at the DNA, mRNA, and protein levels under identical, standardized conditions on a single glass slide, and also provide maximal preservation and utilization of limited and irreplaceable archival tissue samples.

Microtiter-plates

The microtiter-microarray device of the present invention may include any type of bottomless microtiter plate without limitation to the size, shape, and features of the plate; the size, shape, and number of wells; or to the materials and methods used to prepare the plate. Microtiter plates are typically made by injection molding, casting, machining, laser cutting, or vacuum sheet forming one or more resins. The microtiter plates may be made from transparent or opaque materials. A variety of bottomless 96-, 384-, 1536-, and 3456-well plates can be purchased commercially (e.g., from Greiner Labortechnik of Frickenhausen, Germany; Corning Life Sciences of Acton, Massachusetts; etc.).

Gaskets

In certain embodiments, the microtiter plate and the one or more substrates are attached through a single gasket. In other embodiments, the microtiter plate and the one or more substrates are attached through more than one gasket, e.g., through 2, 3, 4, 5, 6, 7, 8, or more gaskets. For example, several gaskets may be arranged side by side, with or without intervening spacings. Alternatively or additionally, several gaskets may be arranged face to face. In general, the one or more gaskets include a plurality of perforations that are dimensioned and arranged in the same pattern as the wells (or a subset thereof) of the microtiter plate to which they are being attached. In certain embodiments, a gasket is used that includes a full set of perforations, e.g., the microtiter plate is a standard 96-, 384-, 1536-, or 3456-well plate and the perforations of the gasket are in the pattern and dimensions of the 96, 384, 1536, or 3456 wells of a 96-, 384-, 1536-, or 3456-well plate, respectively (see for example the gasket of FIG. 2A that was designed to be used with a 384-well plate). In certain other embodiments, a gasket is used that includes a subset of perforations, e.g., the microtiter plate is a standard 96-, 384-, 1536-, or 3456-well plate and the perforations of the gasket are in the pattern and dimensions of a subset of wells of a 96-, 384-, 1536-, or 3456-well plate, respectively (see for example the gasket of FIG. 2B or the gasket of FIG. 13, Panel 17). It is to be understood however that one or more inventive gaskets can be prepared for any type of bottomless microtiter plate without limitation to the size, shape, and features of the plate; the size, shape, and number of wells; or to the materials and methods used to prepare the plate. It is further to be understood that for any given microtiter plate, several gasket formats may be used and that the present invention is in no way limited to a particular gasket format.

In general, the one or more gaskets include one or more layers of adhesive material. Preferably, the first face of the one or more gaskets includes an irreversible adhesive and the second face includes a reversible adhesive. However, in certain other embodiments, the first face of the one or more gaskets may include a reversible adhesive and in yet other embodiments, the second face may include an irreversible adhesive. Any adhesive that provides an irreversible or reversible attachment between the gasket and the microtiter plate or between the one or more substrates and the gasket may be used according to the present invention. In certain embodiments, the gaskets include one or more layers of adhesive material laminated together to achieve an appropriate thickness, e.g., but not limited to 0.25 to 3 mm. For example, the gaskets may include one or more layers of a double-sided pressure-sensitive adhesive (PSA) tape. Any double-sided PSA that is known now or later discovered and that provides an irreversible or reversible, water-tight seal between the gasket and the microtiter plate or between the one or more substrates and the gasket may be used according to the present invention including, but not limited to double-sided PSAs that include acrylic and/or silicone adhesives.

A variety of double-sided PSAs that include acrylic and silicone adhesives are available commercially. The properties of these and other adhesives are described in a variety of commercial manuals, e.g., "*3M Designer's Reference Guide to Adhesive Technology*" and "*3M Manual of Double Coated Tapes, Adhesive Transfer Tapes and Reclosable Fasteners*" both from 3M of St. Paul, Minn., see also the adhesives described in "*Adhesion and Bonding*", Encyclopedia of Polymer Science and Engineering, Vol. 1, pp. 476–546, Interscience Publishers, 1985.

As is well known in the art, silicone adhesives generally form reversible, water-tight seals with plastic and glass surfaces. Silicone adhesives are therefore particularly useful in producing reversible, water-tight seals between inventive gaskets and glass substrates and/or plastic microtiter plates. It will be appreciated that a similar result may be obtained by using one of a variety of clean-release acrylic adhesives that bond reversibly with certain plastic and glass surfaces, e.g., 3M® #9425, from 3M of St. Paul, Minn. and ARcare® #8651 from Adhesives Research of Glen Rock, Pa. Permanent acrylic adhesives may be used to produce an irreversible, water-tight seal between inventive gaskets and glass substrates and/or plastic microtiter plates. A variety of permanent acrylic adhesives that produce irreversible seals with a variety of surfaces (e.g., glass, plastics, silicone, etc.) are also available commercially, e.g., 3M® #8142 from 3M and ARcare® #8175 from Adhesives Research both bond irreversibly with glass surfaces and plastic surfaces.

Preferred gaskets of the present invention include on one face an adhesive (e.g., a silicone adhesive) that forms a reversible, water-tight seal with a glass surface and on the opposite face an adhesive that forms an irreversible, water-tight seal with a plastic surface (e.g., a permanent acrylic adhesive). Exemplary, but non limiting, silicone/acrylic double-sided PSA tapes that may be used for this purpose include 3M® #9731, from 3M and ARclad® #8026, from Adhesives Research.

It is to be understood that the methods of the present invention are not limited to using silicone and/or acrylic double-sided PSAs and that one could use other adhesives, e.g., foam tape scotch brands such as 3M® VHB® #4926 from 3M; epoxy adhesives or liquid adhesives which can be dispensed and allowed to cure at room temperature or by heating, as well as UV curable silicones or RTV silicones (room temperature vulcanization silicones), e.g., those from Loctite of Rocky Hill, Conn. In certain embodiments, spray-on adhesives could also be used, in particular, a gasket could be molded or cast directly onto a microtiter plate whereby perforations in the gasket are produced by alignment with cavities in the mold and the bond to the plate is produced by the process of molding or casting:

In certain preferred embodiments, the gaskets include one or more layers of a non-porous compressible material, such as but not limited to silicone. In certain embodiments, the layer of non-porous compressible material may be directly adhered to one or more substrates having microarrays or to a microtiter plate, i.e., without the use of an adhesive. According to such embodiments, the compressible material may be treated to enhance the binding properties to the one or more substrates having microarrays or to a microtiter plate, e.g., by treatment with a chemical adhesion promoter or primer known in the art (e.g., the PRISM products from Loctite of Rocky Hill, Conn. and the PRONTO Surface Activator from 3M). In certain other embodiments, an inventive gasket may be prepared by applying one or more adhesive layers on the first and/or second face of the compressible material, thereby forming a "sandwich" structure. In certain embodiments, the compressible material may be treated to enhance the binding properties to the adhesive layer, e.g., by treatment with a chemical adhesion promoter or primer known in the art (e.g., the PRISM products from Loctite of Rocky Hill, Conn. and the PRONTO Surface Activator from 3M). When the compressible material is a layer of silicone, it will be also appreciated that other treatments can be applied to enhance bonding between the gasket and the microtiter plate, e.g., UV curable liquid silicone could be dispensed onto the surface of the silicone layer and after application to the plate exposed to UV to form a bond. Generally, silicone adhesives form an irreversible seal with silicone and double-sided PSAs that include a silicone adhesive may therefore be used in preparing a gasket of the present invention that includes a layer of silicone "sandwiched" between two layers of double-sided PSA tape.

Methods of Screening Microarrays Using a Microtiter-microarray Device

The present invention also provides methods of screening microarrays using the microtiter-microarray devices described herein. These methods include: providing a bottomless microtiter plate; providing one or more gaskets; providing one or more substrates with microarrays of materials attached thereto; adhering the bottomless microtiter plate to the first face of the one or more gaskets; adhering the one or more substrates to the second face of the one or more gaskets, whereby a microtiter-microarray device is formed; processing the microarrays of materials in the microtiter-microarray device to determine one or more desired characteristics of the materials; and scanning the microarrays of materials. Preferably, an irreversible, water-tight seal is formed between the first face of the one or more gaskets and the microtiter plate while a reversible, water-tight seal is formed between the one or more substrates and the second face of the one or more gaskets. However, in certain other embodiments, an irreversible, water-tight seal is formed between both the first face of the one or more gaskets and the microtiter plate and between the one or more substrates and the second face of the one or more gaskets. Furthermore, in yet other embodiments, a reversible, water-tight seal is formed between both the first face of the one or more gaskets and the microtiter plate and between the one or more substrates and the second face of the one or more gaskets.

In certain embodiments, the one or more substrates are removed from the microtiter-microarray device before scanning the microarrays of materials. The removal step may be performed manually or more preferably using a removal device. Any device that removes the one or more substrates from the microtiter-microarray device may be used according to the present invention. In certain preferred embodiments the removal device removes the one or more substrates by breaking the reversible, water-tight seal between the one or more substrates and the second face of the one or more gaskets. For example, the removal device may include a rigid material with a plurality of protrusions that are dimensioned and arranged to fit within certain selected wells of the microtiter-microarray device, e.g., wells that do not include a microarray of materials. Generally, a snug fit is obtained between the protrusions and the wells when the width or diameter of the protrusions is between about 80 and 100%, preferably between about 85 and 98%, more preferably between about 90 and 97% of the width or diameter of the wells. Preferably, the protrusions are taller than the microtiter-microarray device is tall, e.g., at least 25, 50, 100, 200, or 500% taller. According to such embodiments, the microtiter-microarray device is placed over the plurality of protrusions so that the protrusions fit within the selected wells of the microtiter-microarray device and break the seal with the one or more gaskets by exerting pressure onto the one or more substrates. In these embodiments, the removal device preferably includes one or more features that are dimensioned and arranged to accommodate or fit within one or more complementary features of the microtiter plate so that the protrusions can be properly and accurately aligned with the selected wells of the microtiter-microarray device.

Gaskets

The present invention also provides gaskets. In general, the one or more gaskets include one or more layers of adhesive material. Preferably, the first face of the one or more gaskets includes an irreversible adhesive and the second face includes a reversible adhesive. However, in certain other embodiments, the first face of the one or more gaskets may include a reversible adhesive and in yet other embodiments, the second face may include an irreversible adhesive. Any adhesive that provides an irreversible or reversible attachment between the gasket and the microtiter plate or between the one or more substrates and the gasket may be used according to the present invention. In certain embodiments, the gaskets include one or more layers of adhesive material laminated together to achieve an appropriate thickness, e.g., but not limited to 0.25 to 3 mm. For example, the gaskets may include one or more layers of a double-sided pressure-sensitive adhesive (PSA) tape. Any double-sided PSA that is known now or later discovered and that provides an irreversible or reversible, water-tight seal between the gasket and the microtiter plate or between the one or more substrates and the gasket may be used according to the present invention including, but not limited to double-sided PSAs that include acrylic and/or silicone adhesives.

A variety of double-sided PSAs that include acrylic and silicone adhesives are available commercially. The properties of these and other adhesives are described in a variety of commercial manuals, e.g., "3*M Designer's Reference Guide to Adhesive Technology*" and "3*M Manual of Double Coated Tapes, Adhesive Transfer Tapes and Reclosable Fasteners*" both from 3M of St. Paul, Minn., see also the adhesives described in "*Adhesion and Bonding*", Encyclopedia of Polymer Science and Engineering, Vol. 1, pp. 476–546, Interscience Publishers, 1985.

As is well known in the art, silicone adhesives generally form reversible, water-tight seals with plastic and glass surfaces. Silicone adhesives are therefore particularly useful in producing reversible, water-tight seals between inventive gaskets and glass substrates and/or plastic microtiter plates. It will be appreciated that a similar result may be obtained by using one of a variety of clean-release acrylic adhesives that bond reversibly with certain plastic and glass surfaces, e.g., 3M® #9425, from 3M of St. Paul, Minn. and ARcare® #8651 from Adhesives Research of Glen Rock, Pa. Permanent acrylic adhesives may be used to produce an irreversible, water-tight seal between inventive gaskets and glass substrates and/or plastic microtiter plates. A variety of permanent acrylic adhesives that produce irreversible seals with a variety of surfaces (e.g., glass, plastics, silicone, etc.) are also available commercially, e.g., 3M® #8142 from 3M and ARcare® #8175 from Adhesives Research both bond irreversibly with glass surfaces and plastic surfaces.

Preferred gaskets of the present invention include on one face an adhesive (e.g., a silicone adhesive) that forms a reversible, water-tight seal with a glass surface and on the opposite face an adhesive that forms an irreversible, water-tight seal with a plastic surface (e.g., a permanent acrylic adhesive). Exemplary, but non limiting, silicone/acrylic double-sided PSA tapes that may be used for this purpose include 3M® #9731, from 3M and ARclad® #8026, from Adhesives Research.

It is to be understood that the methods of the present invention are not limited to using silicone and/or acrylic double-sided PSAs and that one could use other adhesives, e.g., foam tape scotch brands such as 3M® VHB® #4926 from 3M; epoxy adhesives or liquid adhesives which can be dispensed and allowed to cure at room temperature or by heating, as well as UV curable silicones or RTV silicones (room temperature vulcanization silicones), e.g., those from Loctite of Rocky Hill, Conn. In certain embodiments, spray-on adhesives could also be used, in particular, a gasket could be molded or cast directly onto a microtiter plate whereby perforations in the gasket are produced by alignment with cavities in the mold and the bond to the plate is produced by the process of molding or casting.

In certain preferred embodiments, the gaskets include one or more layers of a non-porous compressible material, such as but not limited to silicone. In certain embodiments, the layer of non-porous compressible material may be directly adhered to one or more substrates having microarrays or to a microtiter plate, i.e., without the use of an adhesive. According to such embodiments, the compressible material may be treated to enhance the binding properties to the one or more substrates having microarrays or to a microtiter plate, e.g., by treatment with a chemical adhesion promoter or primer known in the art (e.g., the PRISM products from Loctite of Rocky Hill, Conn. and the PRONTO Surface Activator from 3M). In certain other embodiments, an inventive gasket may be prepared by applying one or more adhesive layers on the first and/or second face of the compressible material, thereby forming a "sandwich" structure. In certain embodiments, the compressible material may be treated to enhance the binding properties to the adhesive layer, e.g., by treatment with a chemical adhesion promoter or primer known in the art (e.g., the PRISM products from Loctite of Rocky Hill, Conn. and the PRONTO Surface Activator from 3M). When the compressible material is a layer of silicone, it will be also appreciated that other treatments can be applied to enhance bonding between the gasket and the microtiter plate, e.g., UV curable liquid silicone could be dispensed onto the surface of the silicone layer and after application to the plate exposed to UV to form a bond. Generally, silicone adhesives form an irreversible seal with silicone and double-sided PSAs that include a silicone adhesive may therefore be used in preparing a gasket of the present invention that includes a layer of silicone "sandwiched" between two layers of double-sided PSA tape.

The gaskets also include a plurality of perforations. The perforations of the gaskets may be in the pattern and dimensions of any bottomless microtiter plate, without limitation to the size, shape, and features of the plate; the size, shape, and number of wells; or to the materials and methods used to prepare the plate. The perforations may be formed by a variety of methods, including but not limited to, die-cutting using a combination of steel punches and a hydraulic press; steel-rule die and rotary press; laser cutting, e.g., with a carbon dioxide laser; etc. Preferred gaskets include perforations that are in the pattern and dimensions of a 96-, 384-, 1536-, or 3456-well plate. In certain preferred embodiments, the gaskets may be provided with a release liner on the first and/or second face.

Alignment Devices

The present invention also provides devices for aligning bottomless microtiter plates with one or more inventive gaskets. Any device that aligns a microtiter plate with an inventive gasket is encompassed by the present invention. In certain preferred embodiments this first aligning device aligns the plate and one or more gaskets so that the wells of the plate are aligned with the perforations of the one or more gaskets. For example, the first aligning device may include a rigid material with a plurality of protrusions that are dimensioned and arranged to fit within the perforations of the one or more gaskets. Generally, a snug fit is obtained between the protrusions and the perforations when the width or diameter of the protrusions is between about 80 and 100%, preferably between about 85 and 98%, more preferably between about 90 and 97% of the width or diameter of the perforations. In certain embodiments, the protrusions are taller than the one or more gaskets are thick, e.g., at least 25, 50, 100, 200, or 500% taller. In these and other embodiments, the first aligning device may further include one or more features that are dimensioned and arranged to accommodate or fit within one or more complementary features of the microtiter plate. For example, the plurality of protrusions may be located within a chamber that is dimensioned to fit around the outer walls of the microtiter plate. Additionally, the first aligning device may include a peripheral depression which is designed to accommodate the perimeter of the microtiter plate. Alternatively, the first aligning device may include a plurality of peripheral columns that are designed to fit into holes present in the perimeter of the microtiter plate. It is to be understood that the present invention is not limited to any particular combination of complementary features and that any combination sufficient to align a microtiter plate with one or more gaskets is encompassed by the present invention.

The present invention also provides devices for aligning one or more substrates with a microtiter plate and attached gasket or gaskets. Any device that aligns one or more substrates with a microtiter plate and attached gasket or gaskets is encompassed by the present invention. In certain preferred embodiments this second aligning device aligns the one or more substrates with the microtiter plate and attached gasket or gaskets so that some or all of the perforations of the gasket or gaskets (and hence some or all of the wells of the plate) are aligned with microarrays on the one or more substrates. For example, the second aligning device may include a rigid material with one or more casings that are shaped and dimensioned to accommodate a substrate. Generally, a snug fit is obtained between the casings and the substrates when the width and length of the substrates is between about 80 and 100%, preferably between about 85 and 98%, more preferably between about 90 and 97% of the width and length of the casings. Preferably, the second aligning device also includes one or more features that are dimensioned and arranged to accommodate or fit within one or more complementary features of the microtiter plate so that the microarrays on the substrates can be properly and accurately aligned with the wells of the microtiter-microarray device.

Removal Devices

The present invention also provides devices for removing one or more substrates from the microtiter-microarray device before scanning the microarrays of materials. Any device that removes one or more substrates from the microtiter-microarray device is encompassed by the present invention. In certain preferred embodiments the removal device removes the one or more substrates by breaking the seal between the one or more substrates and the one or more gaskets. For example, the removal device may include a rigid material with a plurality of protrusions that are dimensioned and arranged to fit within certain wells of the microtiter-microarray device. Generally, a snug fit is obtained between the protrusions and the perforations when the width or diameter of the protrusions is between about 80 and 100%, preferably between about 85 and 98%, more preferably between about 90 and 97% of the width or diameter of the perforations. Preferably, the protrusions are taller than the microtiter-microarray device is tall, e.g., at least 25, 50, 100, 200, or 500% taller. According to such embodiments, the microtiter-microarray device is placed over the plurality of protrusions so that the protrusions fit within selected wells of the microtiter-microarray device and break the seal with the one or more gaskets by exerting pressure onto the one or more substrates. In these embodiments, the removal device preferably includes one or more features that are dimensioned and arranged to accommodate or fit within one or more complementary features of the microtiter plate so that the protrusions can be properly and accurately aligned with the selected wells of the microtiter-microarray device.

Kits

The present invention also provides kits that include a bottomless microtiter plate; a device for aligning one or more gaskets with a microtiter-plate; a device for aligning one or more substrates with a microtiter plate and attached gasket or gaskets; and one or more gaskets. These kits may further include one or more substrates with microarrays of materials attached thereto and/or a device for removing one or more substrates from a microtiter-microarray device.

EXAMPLES

Example 1 describes how the inventive processes and devices have been used to combine standard glass slides with an exemplary 384-well bottomless microtiter plate (Greiner #781000 from Greiner Labortechnik, Frickenhausen, Germany). Example 2 describes how the inventive processes and devices have been used to combine microarrays with an exemplary 96-well bottomless microtiter plate (Greiner #655000 from Greiner Labortechnik, Frickenhausen, Germany). Example 3 describes the results of a protein binding assay that was performed using the inventive 96-well microtiter-microarray device of Example 2. Examples 4 and 5 describe yet other inventive processes and devices that have been used to combine microarrays with another exemplary 96-well bottomless microtiter plate (Grace Bio-Labs #GR60105 and #GR60102 from Grace Bio-Labs of Bend, Oreg.). It is to be understood that the processes and devices described in these examples may be adapted for use with microarrays that are arranged on substrates made from other materials and/or substrates with different shapes or dimensions. It is yet further to be understood that the same processes and devices may be adapted for use with any type of bottomless microtiter plate without limitation to the size, shape, and features of the plate; the size, shape, and number of wells; or to the materials and methods used to prepare the plate.

Example 1

Example 1 describes how the inventive processes and devices have been used to combine standard glass slides with an exemplary 384-well bottomless microtiter plate (Greiner #781000). A bottomless 384-well plate (Product #781000 from Greiner Labortechnik of Frickenhausen, Germany) was first provided (not shown). The 384 square wells of the plate were separated by a plurality of walls and were arranged in a microarray of sixteen rows (labeled A–P) and twenty-four columns (labeled 1–24). The square wells were about 3.2 mm wide and about 12 mm deep. The walls were about 1.3 mm wide. The center to center distance between adjacent wells was therefore about 4.5 mm.

Figure 2A:
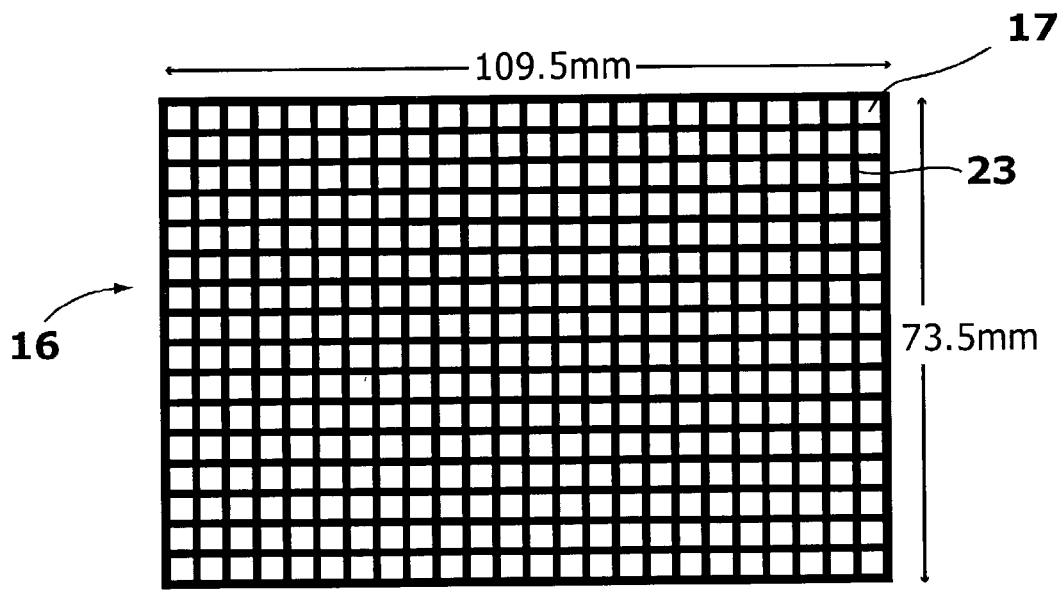
FIG. 2A depicts an inventive gasket that includes 384 square perforations that are dimensioned and spaced to match the arrangement of wells in a 384-well microtiter plate (Greiner #781000).
Figure 2B:
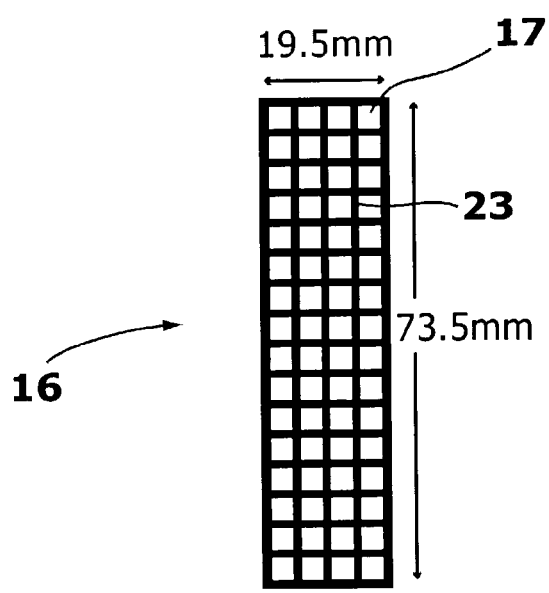
FIG. 2B depicts an inventive gasket that includes 64 square perforations that are dimensioned and spaced to match a subset of the arrangement of wells in a 384-well microtiter plate (Greiner #781000).

Referring to FIG. 2A, a 73.5 mm by 109.5 mm silicone gasket 16 was also provided. The gasket 16 was prepared from a 1 mm thick calendared sheet of silicone that was cleaned to remove particulates using a lint-roller and then treated on both surfaces by dipping the sheet into an adhesion promoter (PRISM 770 #18397 from Loctite), rinsing with distilled water, and air drying. Pressure sensitive silicone/acrylic double-sided tape (3M® #9731, from 3M) with release liner on both sides was then laminated to both faces of the silicone sheet using a roller in such a way that the silicone adhesive side of the tape became irreversibly affixed to the first face of the silicone sheet surface (the permanent acrylic adhesive side remained protected by the release liner) and the permanent acrylic adhesive side of the tape became irreversibly affixed to the second face of the silicone sheet surface (the silicone adhesive side remained protected by the release liner). 384 square perforations 17 dimensioned and arranged in the same manner as the 384 square wells of the plate were then formed by die cutting through the laminated material using a steel punch and hydraulic press. More specifically, the square perforations 17 were about 3.2 mm wide and separated by walls 23 that were about 1.3 mm wide. The resulting gasket 16 is illustrated in Panel 7 of FIG. 12.

Figure 3A:
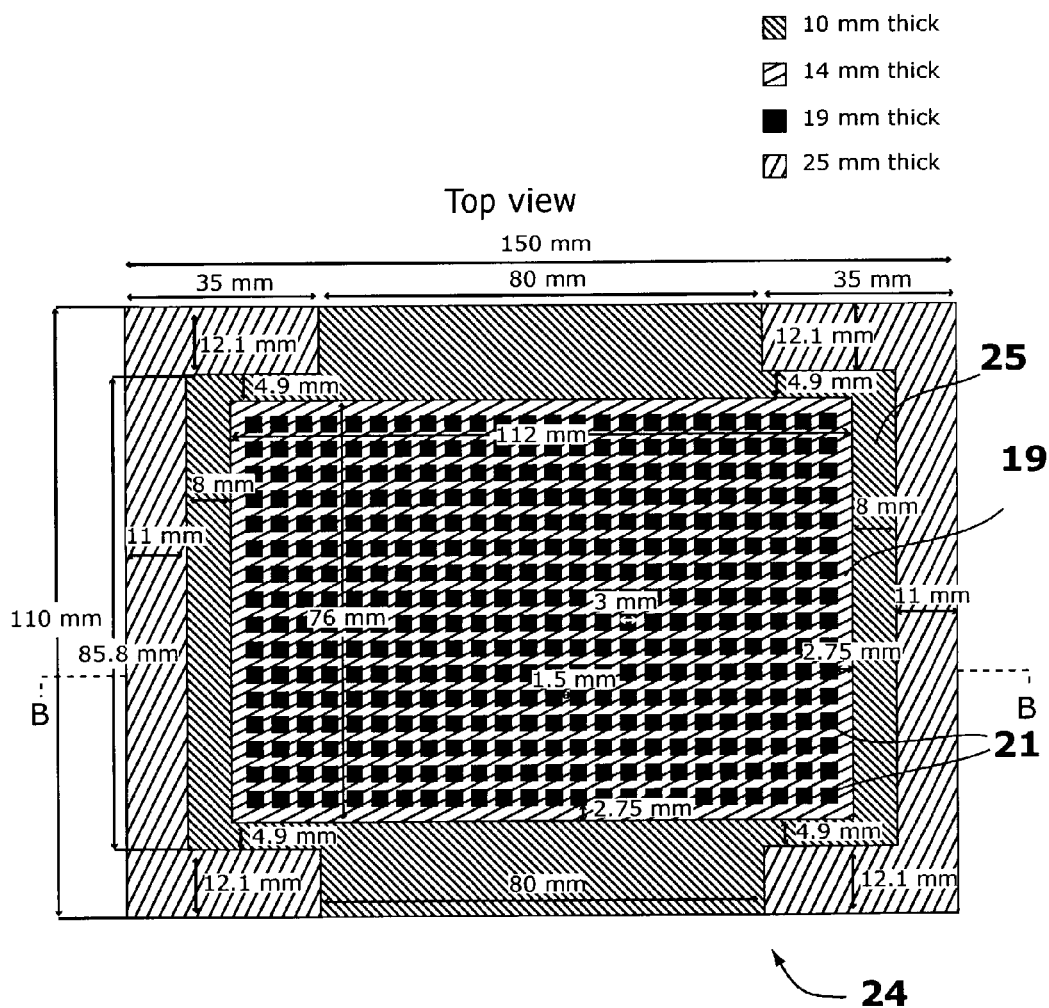
FIGS. 3A and 3B depict a top view and a side view, respectively, of a device for aligning one or more inventive gaskets with a bottomless 384-well microtiter plate (Greiner #781000).
Figure 3B:
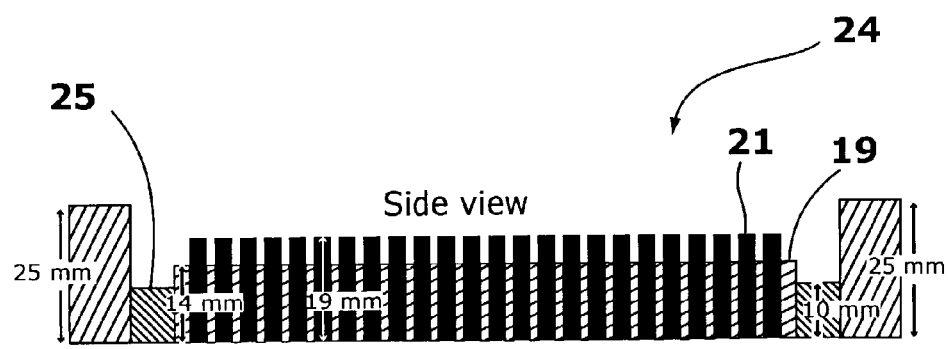

The gasket 16 and plate were then aligned and stuck together using a first aligning device 24 that is illustrated in FIG. 3. The device 24 included a plurality of square columns 21 that were arranged on a plateau 19 in a microarray that matched the pattern of perforations 17 of the gasket 16. The square columns 21 were about 3 mm wide and extended about 5 mm above the plateau 19. The centers of the square columns 21 were separated by about 4.5 mm (i.e., the spacings of the 384-well plate). The plateau 19 was raised about 4 mm above a surrounding depression 25 that was dimensioned to accommodate the outer perimeter of the plate. The device 24 was machined from plastic but could have been machined from any other suitable rigid material including, but not limited to, metals such as aluminum. As shown in Panel 8 of FIG. 12, the release liner was then peeled off the first side of the gasket 16 to expose the acrylic adhesive. The gasket 16 was then placed on the device 24, with the exposed acrylic adhesive (i.e., first side) facing up. The columns 21 passed through the perforations 17 and extended about 4 mm above the first side of the gasket 16. The plate was subsequently placed over the first side of the gasket 16 with its bottom face facing down. The wells of the plate fitted around the exposed tips of the columns 21 and the outer perimeter of the plate slotted into the depression 25 surrounding the plateau 19. In this arrangement, the wells of the plate were aligned with the perforations 17 of the gasket 16. Pressure was then applied to the microtiter plate to form an irreversible, water-tight seal between the walls 23 on the first side of the gasket 16 and the walls on the bottom face of the plate. The resulting microtiter-gasket device is shown in Panel 9 of FIG. 12.

Figure 4:
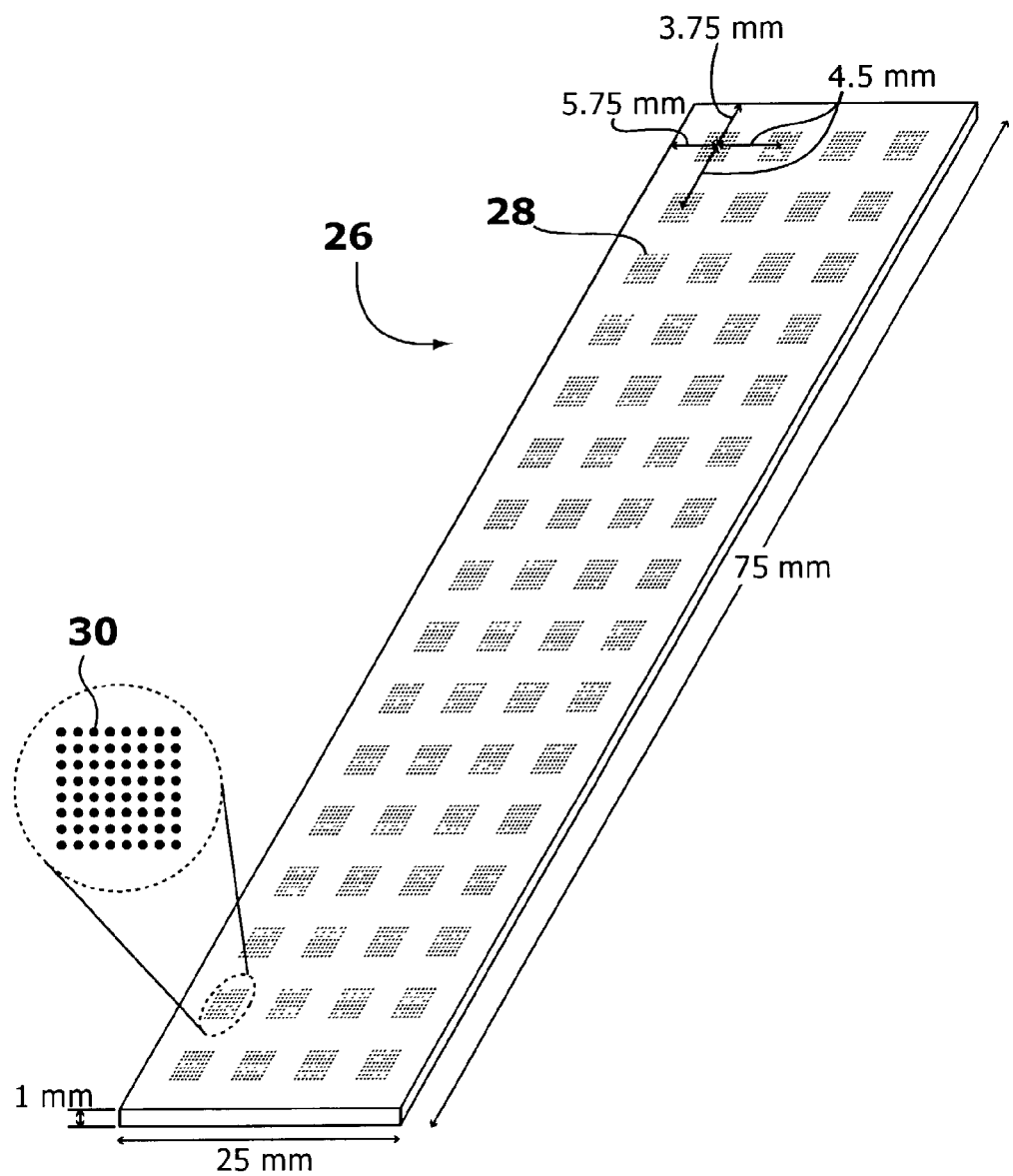
FIG. 4 depicts a substrate with 64 microarrays, each composed of 64 different materials arranged in an 8×8 array. The centers of the 64 microarrays are spaced according to the spacing of a 384-well plate (i.e., 4.5 mm).

Four 25 mm by 75 mm glass slides 26 (1 mm thick) were then provided. Although the glass slides 26 that were tested did not include microarrays; the following discussion describes the prophetic combination of slides 26 that include an exemplary arrangement of microarrays 28. Referring to FIG. 4, the microarrays 28 are spaced on the slides 26 according to the spacing of the wells of the 384-well plate (i.e., 4.5 mm spacing). In FIG. 4, sixty-four distinct microarrays 28 are patterned on each slide 26; four columns of microarrays 28 across the width of the slide 26 and sixteen rows of microarrays 28 across its length. The microarray 28 which is located in the first row and the first column of each slide 26 is preferably centered about 5.75 mm from the left hand edge of the slide 26 and about 3.75 mm from the top hand edge of the slide 26. Each individual microarray 28 may be composed of any number of spots 30 of material (64 spots 30 are shown in FIG. 4 arranged in an 8×8 array).

Figure 5A:
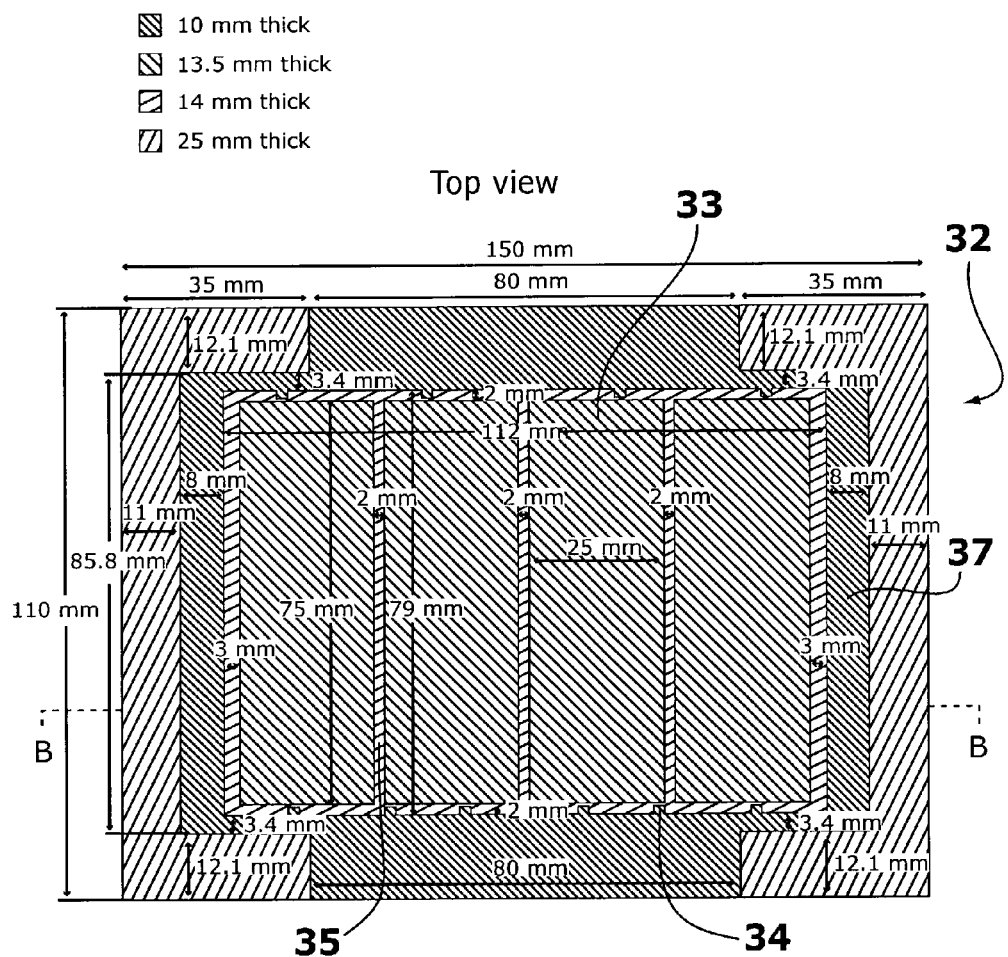
FIGS. 5A and 5B depict a top view and a side view, respectively, of a device for aligning one or more substrates with a 384-well microtiter plate (Greiner #781000) that has one or more inventive gaskets attached thereto.
Figure 5B:
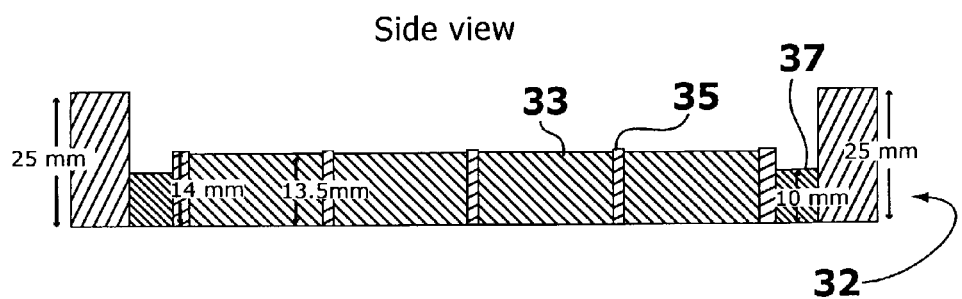

The glass slides 26 are then aligned with and stuck to the gasket 16 (and plate) using a second aligning device 32 that is illustrated in FIG. 5. The device 32 includes four casings 33 that are each dimensioned to accommodate a single 25 mm by 75 mm slide 26. The walls 35 of the casings 33 are about 0.5 mm tall and include a plurality of notches 34 that are positioned and dimensioned to accommodate small ridges located around the perimeter of the plate. The notches 34 are 2 mm wide; the left edges of the four notches 34 along the top wall of the casings 33 are located 29 mm, 56 mm, 92 mm, and 119 mm from the left hand edge of the device 32; and the left edges of the six notches 34 along the bottom wall of the casings 33 are located 31.25 mm, 49.25 mm, 62.75 mm, 85.25 mm, 98.75 mm, and 116.75 mm from the left hand edge of the device 32. The four slides 26 are first placed face up (i.e., with the microarrayed sides facing up) within the four casings 33. The release liner is then removed from the second side of the gasket to expose the silicone adhesive (as shown in Panel 10 of FIG. 12) and the plate is then lowered onto the slides 26 with the second side of the gasket 16 facing down. The small ridges of the plate fit into the notches 34 and the outer perimeter of the plate slots into the depression 37 surrounding the casings 33. In this arrangement, the four slides 26 form a reversible, water-tight seal with the gasket 16 (and hence the plate), with the length of the slides 26 running across the width of the plate. The wells of the plate are aligned with the microarrays 28 of the slides 26 with each individual microarray 28 positioned in the bottom of a different well. All sixteen rows (A-P) of the plate contain microarrays 28 and columns 2–5, 8–11, 14–17, and 20–23 each contain microarrays 28 (i.e., 256 wells of the 384-well plate contain the 256 microarrays 28). The resulting microtiter-microarray device is shown in Panel 11 of FIG. 12.

Figure 6A:
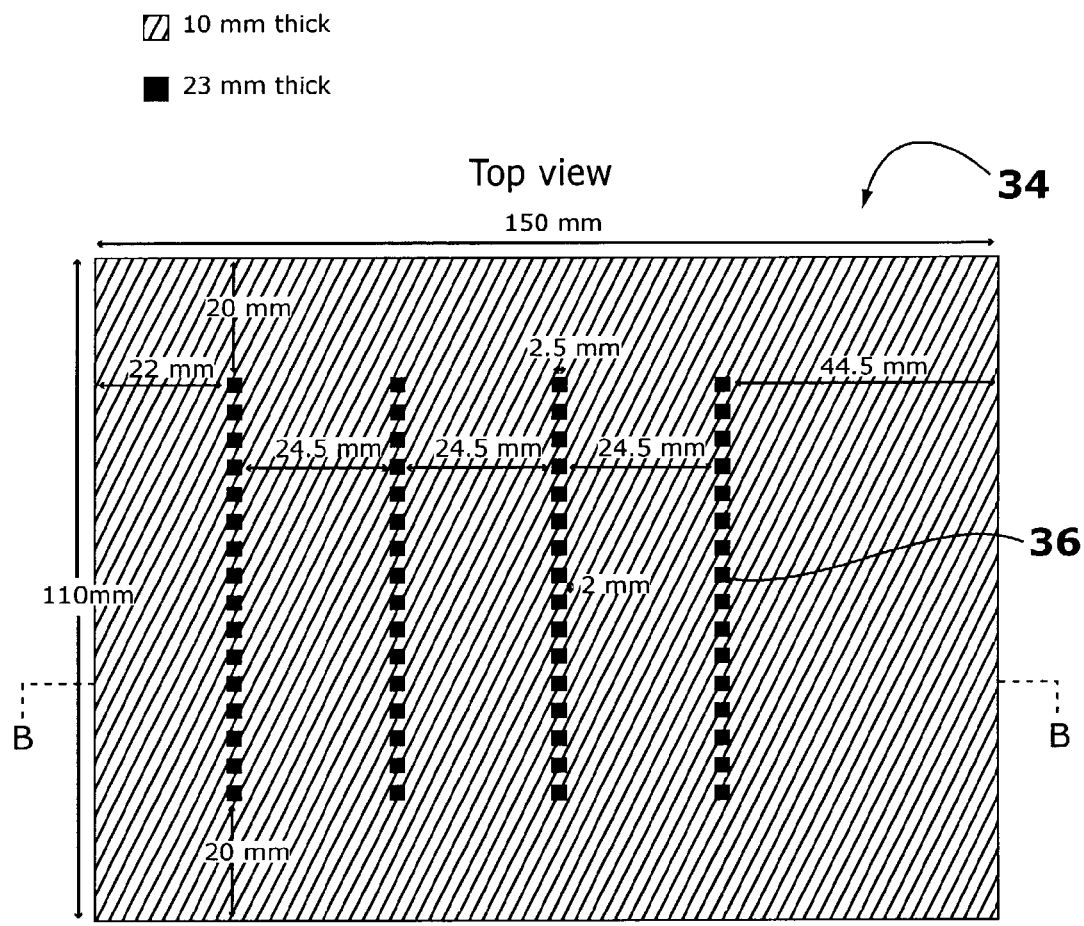
FIGS. 6A and 6B depict a top view and a side view, respectively, of a device for removing one or more substrates from an inventive microtiter-microarray device that includes a 384-well microtiter plate (Greiner #781000).
Figure 6B:
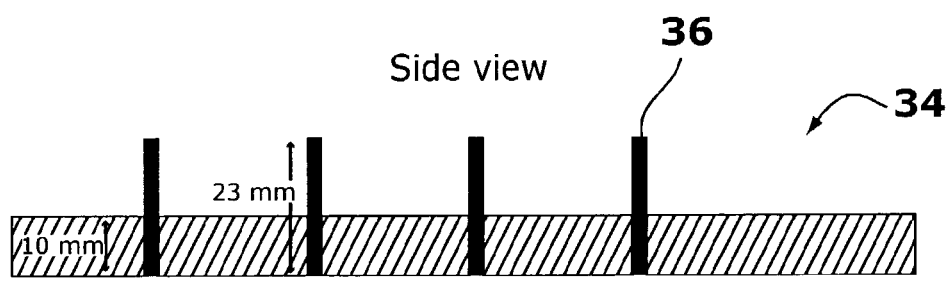
Figure 12:
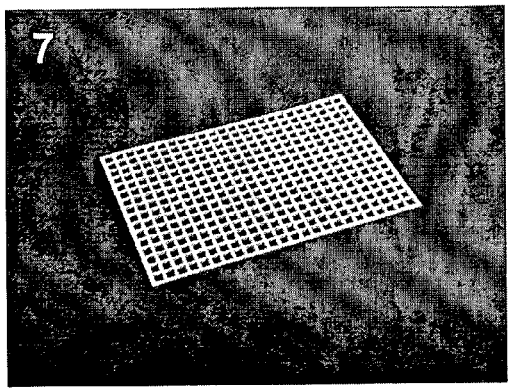
FIG. 12 depicts a series of photographs that were taken at different stages during the assembly of an inventive microtiter-microarray device that includes a 384-square well microtiter plate (Greiner #781000 from Greiner Labortechnik of Frickenhausen, Germany).
Figure 12:
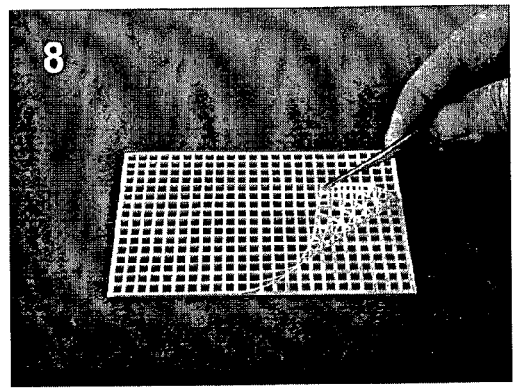
Figure 12:
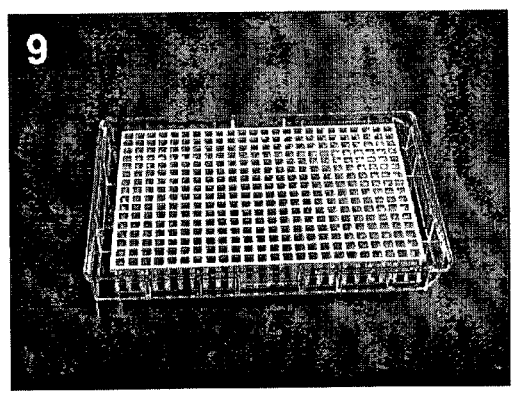
Figure 12:
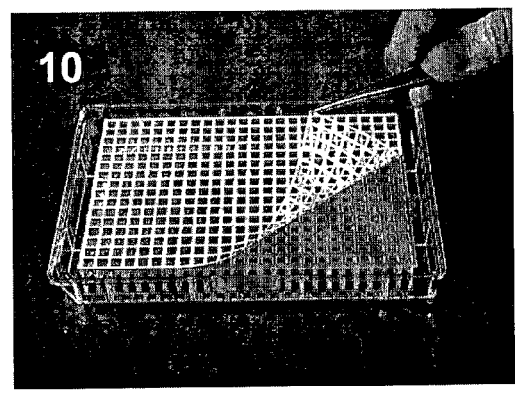
Figure 12:
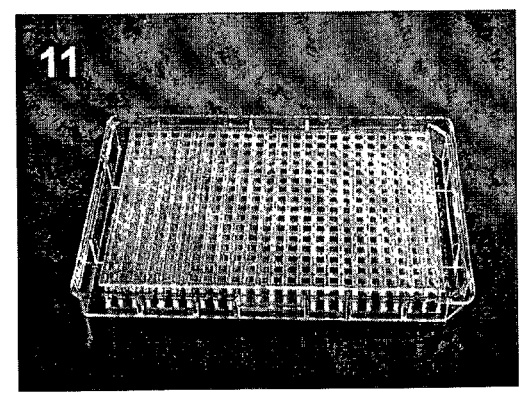
Figure 12:
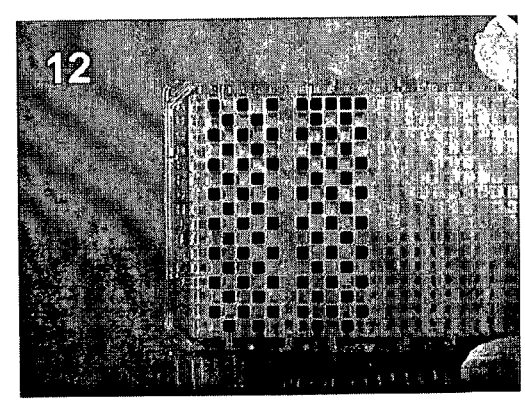

The plate with the attached slides 26 is then processed with standard plate-handling robotics (not shown). Panel 12 of FIG. 12 shows a top view of the microtiter-microarray device after a solution of dark food-dye was deposited in alternating wells of the plate. No leakage was observed between the wells of the plate. Once the plate has been processed, the slides 26 are removed and scanned with conventional slide scanners (not shown). The slides 26 are removed from the plate using a third device 34 that is illustrated in FIG. 6. The plate is lowered up-side-down onto the device 34 such that the square columns 36 insert into the wells in columns 1, 7, 13, and 19 of the plate. The columns 36 exert pressure onto the unused left edge of the slides 26, thereby breaking the reversible seal with the second side of the gasket 16 and freeing the slides 26 to be scanned.

Example 2

Example 2 describes how the inventive processes and devices have been used to combine microarrays with an exemplary 96-well bottomless microtiter plate (Greiner # 655000). A bottomless 96-well plate (Product #655000 from Greiner Labortechnik of Frickenhausen, Germany) was first provided (not shown). The 96 circular wells of the plate were separated by a plurality of walls and were arranged in a microarray of eight rows (labeled A–H) and twelve columns (labeled 1–12). The circular wells had diameters of about 6.5 mm and were about 11 mm deep. The walls were about 2.5 mm wide at their narrowest point and the center to center distance between adjacent wells was about 9 mm.

Figure 7:
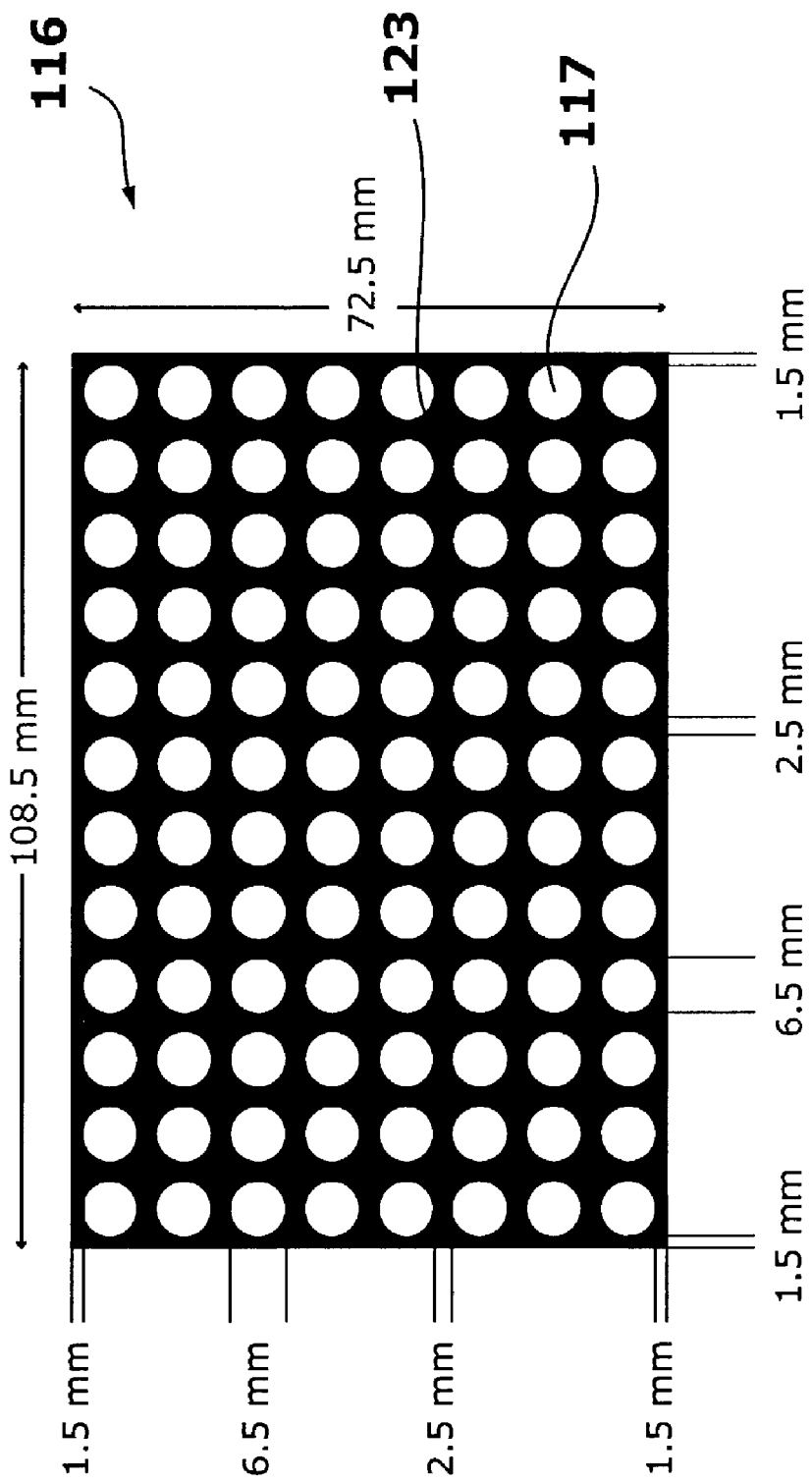
FIG. 7 depicts an inventive gasket that includes 96 circular perforations that are dimensioned and spaced to match the arrangement of wells in a 96-well microtiter plate (Greiner #655000).

Referring to FIG. 7, a 72.5 mm by 108.5 mm gasket 116 was also provided. The gasket 116 was prepared from a 1 mm thick calendared sheet of silicone. Pressure sensitive silicone/acrylic double-sided tape (ARclad® #8026 from Adhesives Research) with release liner on both sides was then laminated to both faces of the silicone sheet using a roller in such a way that the silicone adhesive side of the tape became irreversibly affixed to the first and second face of the silicone sheet surface (the permanent acrylic adhesive sides remained protected by the release liners). 96 circular perforations 117 dimensioned and arranged in the same manner as the 96 circular wells of the plate were then formed using a carbon dioxide laser. More specifically, the perforations 117 had diameters of about 6.5 mm and were separated by walls 123 that were about 2.5 mm wide at their narrowest point. The resulting gasket 116 is illustrated in Panel 1 of FIG. 11.

Figure 8A:
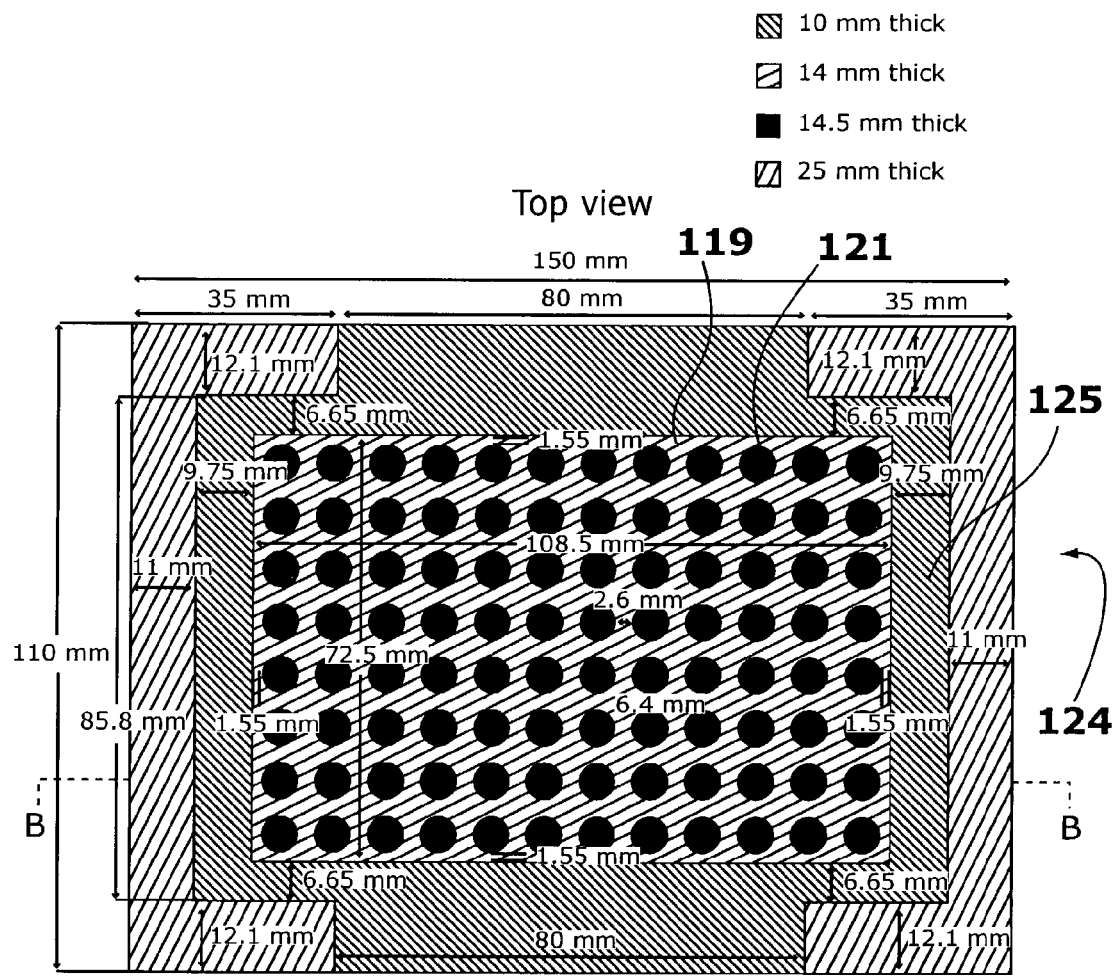
FIGS. 8A and 8B depict a top view and a side view, respectively, of a device for aligning one or more substrates with a 96-well microtiter plate (Greiner #655000) that has one or more inventive gaskets attached thereto.
Figure 8B:
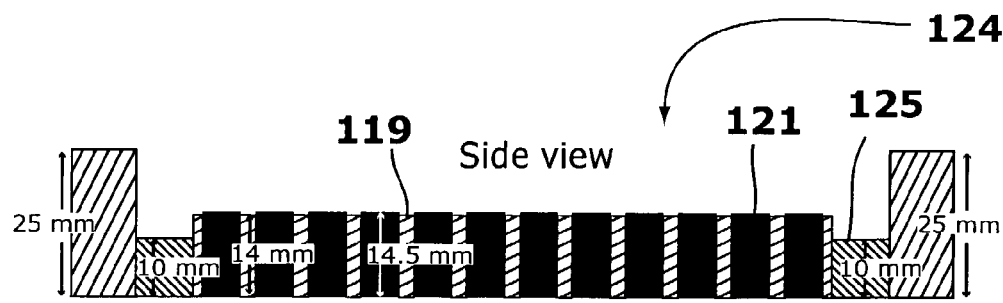

The gasket 116 and plate were aligned and stuck together using a first aligning device 124 that is illustrated in FIG. 8. The device 124 included a plurality of cylindrical columns 121 that were arranged on a plateau 119 in a microarray that matched the pattern of perforations 117 of the gasket 116. The cylindrical columns 121 had diameters of about 6.4 mm and extended about 0.5 mm above the plateau 119. The plateau 119 was raised about 4 mm above the surrounding depression 125. The device 124 was machined from plastic but could have been machined from any other suitable rigid material including, but not limited to, metals such as aluminum. As shown in Panel 2 of FIG. 11, the release liner was then peeled off the first side of the gasket 116 to expose the acrylic adhesive. The gasket 116 was then placed on the device 124, with the exposed acrylic adhesive (i.e., first side) facing up. The columns 121 fitted into the perforations 117 but did not extend above the first side of the gasket 116. The plate was subsequently placed over the gasket 116 with its bottom face facing down. The outer perimeter of the plate slotted into the depression 125 surrounding the plateau 119. In this arrangement, the wells of the plate were aligned with the perforations 117 of the gasket 116. Pressure was then applied to the microtiter plate to form an irreversible, water-tight seal between the walls 123 on the first side of the gasket 116 and the walls on the bottom face of the plate. The resulting microtiter-gasket device is shown in Panel 3 of FIG. 11.

Figure 9:
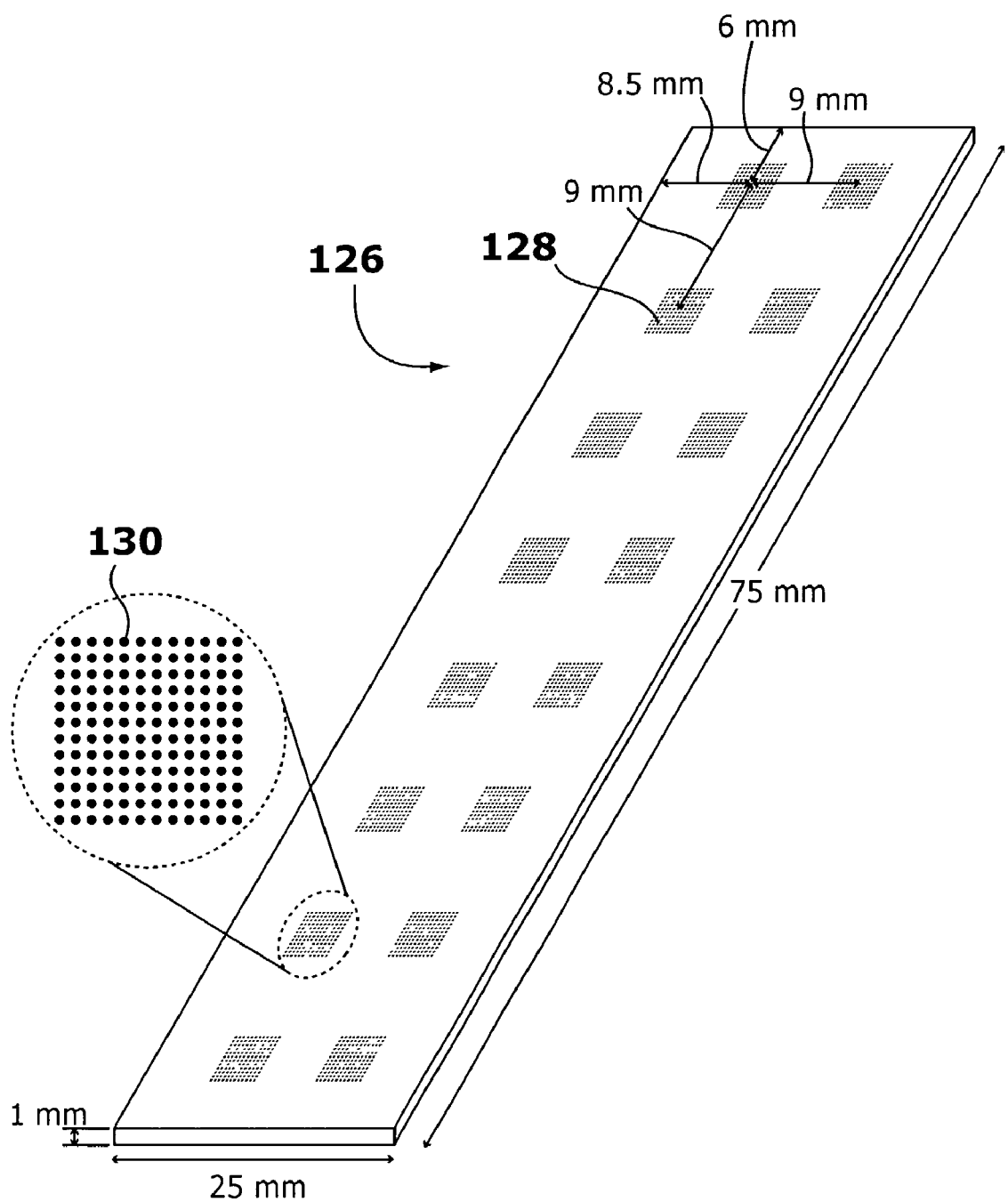
FIG. 9 depicts a substrate with 16 microarrays, each composed of 144 different materials arranged in an 12×12 array. The centers of the 16 microarrays are spaced according to the spacing of a 96-well plate (i.e., 9 mm).

Referring now to FIG. 9, four 25 mm by 75 mm glass slides 126 (1 mm thick) with microarrays 128 arranged thereon were then provided. The microarrays 128 were spaced on the slides 126 according to the spacing of the wells of the 96-well plate (i.e., 9 mm spacing). Sixteen distinct microarrays 128 were patterned on each glass slide; two columns of microarrays 128 across the width of the slide 126 and eight rows of microarrays 128 across its length. The microarray 128 which was located in the first row and the first column of each slide 126 was centered about 8.5 mm from the left hand edge of the slide 126 and about 6 mm from the top hand edge of the slide 126. Each individual microarray 128 included 144 protein spots 130 having a diameter of about 180 µm that were arranged in twelve rows and twelve columns with a spatial density of about 250 µm center to center.

Figure 10A:
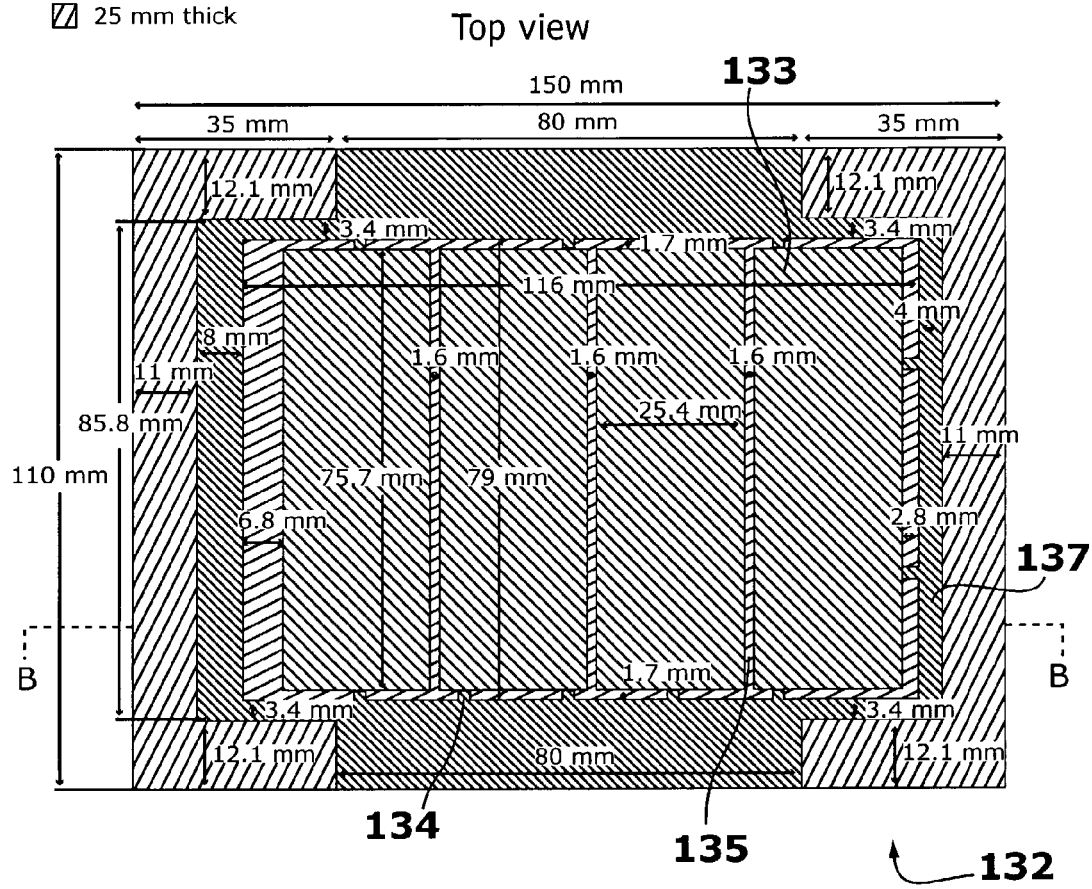
FIGS. 10A and 10B depict a top view and a side view, respectively, of a device for aligning one or more substrates with a 96-well microtiter plate (Greiner #655000) that has one or more inventive gaskets attached thereto.
Figure 10B:
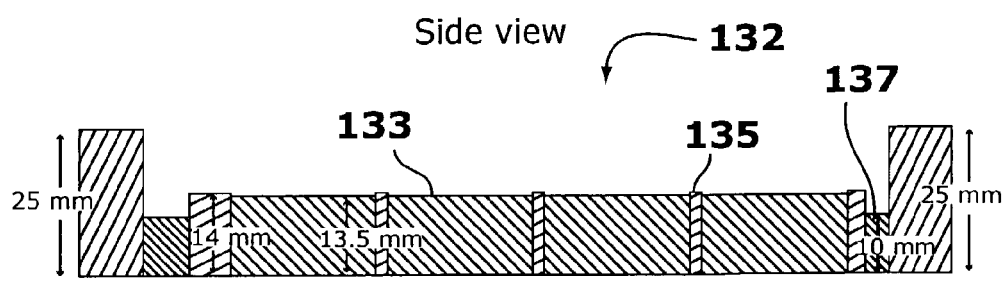

The glass slides 126 were then aligned with and stuck to the gasket 116 (and plate) using a second aligning device 132 that is illustrated in FIG. 10. The device 132 included four casings 133 that were each dimensioned to accommodate a 25 mm by 75 mm slide 126. The walls 135 of the casings 133 were 0.5 mm tall and included a plurality of notches 134 that were positioned and dimensioned to accommodate small ridges located around the perimeter of the plate. The notches 134 were 2 mm wide; the left edges of the three notches 134 along the top wall of the casings 133 were located 38 mm, 74 mm, and 110 mm from the left hand edge of the device 132; and the left edges of the five notches 134 along the bottom wall of the casings 133 were located 38 mm, 56 mm, 74 mm, 93 mm, and 110 mm from the left hand edge of the device 132. The four slides 126 were first placed face up (i.e., with the microarrayed sides facing up) within the four casings 133. The release liner was then removed from the second side of the gasket to expose the acrylic adhesive (as shown in Panel 4 of FIG. 11) and the plate was then lowered onto the slides 126 with the second side of the gasket 116 facing down. The small ridges of the plate fitted into the notches 134 and the outer perimeter of the plate slotted into the depression 137 surrounding the casings 133. In this arrangement, the four slides 126 formed an irreversible, water-tight seal with the gasket 116 (and hence the plate), with the length of the slides 126 running across the width of the plate. The individual microarrays 128 of the glass slides 126 were thereby positioned in the bottom of different wells. The four slides 126 were attached to the plate, with the length of the slides 126 running across the width of the plate. All eight rows (A–H) of the plate contained microarrays 128 and columns 2–5 and 8–11 each contained microarrays 128 (i.e., 64 wells of the 96-well plate contained the 64 microarrays 128). The resulting microtiter-microarray device is shown in Panel 5 of FIG. 11.

Figure 11:
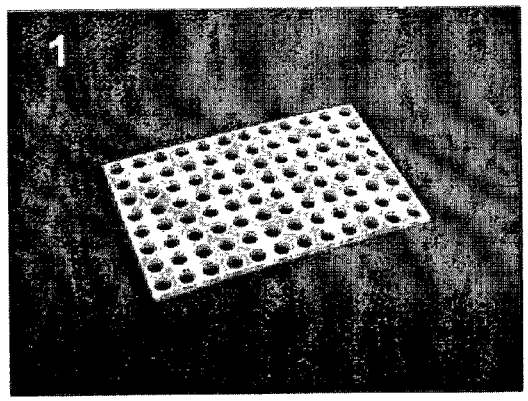
FIG. 11 depicts a series of photographs that were taken at different stages during the assembly of an inventive microtiter-microarray device that includes a 96-circular well microtiter plate (Greiner #655000 from Greiner Labortechnik of Frickenhausen, Germany).
Figure 11:
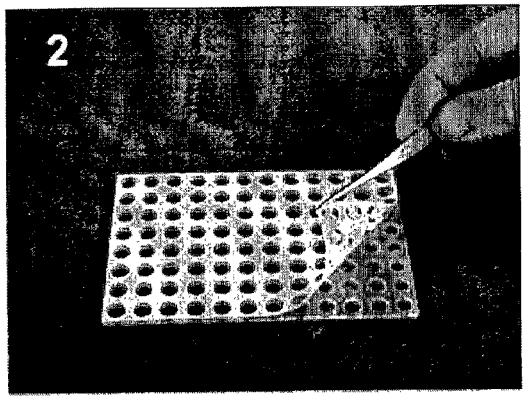
Figure 11:
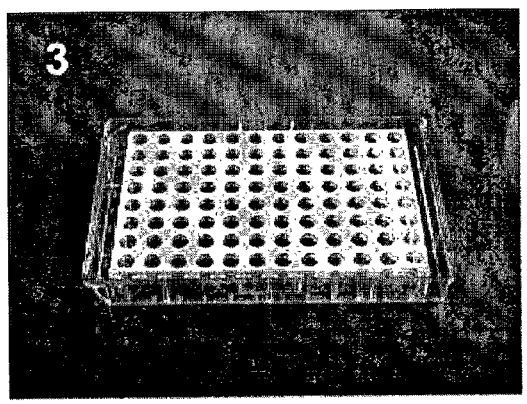
Figure 11:
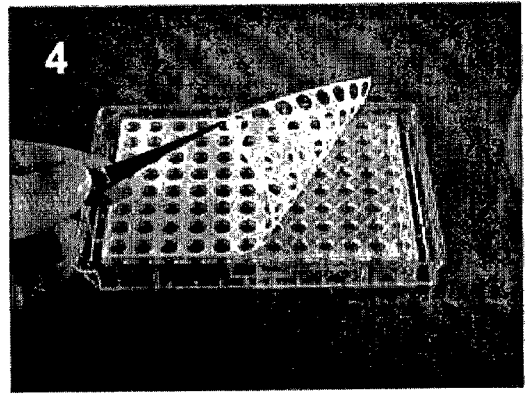
Figure 11:
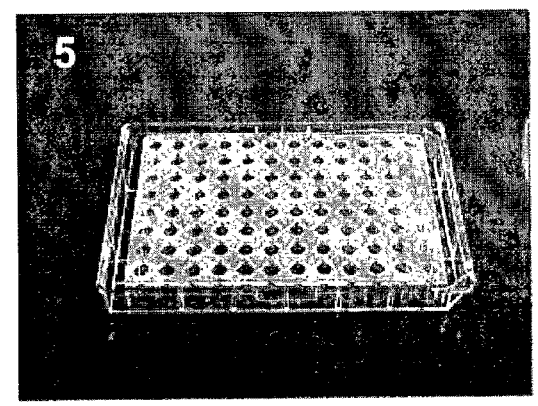
Figure 11:
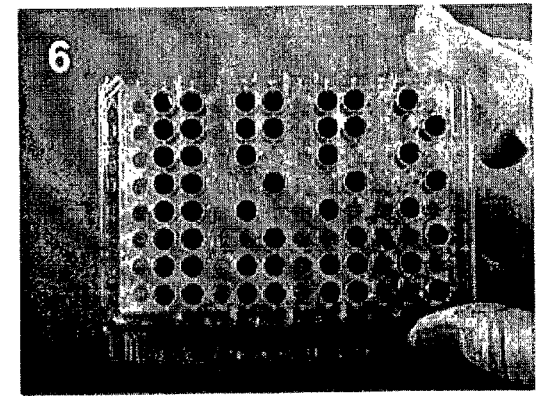

The plate with the attached slides 126 were then processed with standard plate-handling robotics (described in Example 3). Panel 6 of FIG. 11 shows a top view of the microtiter-microarray device after a solution of dark food-dye was deposited in alternating wells of the plate and left to sit for 72 hours under humidified conditions. No leakage was observed between the wells of the plate.

Once the plate had been processed, the slides 126 were scanned as described in Example 3 with a fluorescence scanner that is able to scan microarrays in a microtiter plate format (Tecan LS-200 scanner from Tecan of Durham, N.C.).

Example 3

Example 3 describes the results of a protein binding assay that was performed using the inventive 96-well microtiter-microarray device of Example 2.

Printing Protein Microarrays 144 different putative coiled coil strands were used that were previously identified from the genome sequence of *Saccharomyces cerevisiae* (Newman et al., *Proc. Natl. Acad. Sci. USA* 97:13203, 2000). The coding sequence for each polypeptide was cloned into an expression vector that added a hexahistidine tag to its N-terminus. The polypeptides were produced recombinantly in *Escherichia coli* and purified under denaturing conditions (6 M guanidinium chloride) by immobilized metal affinity chromatography (Ni-agarose). The proteins were then dissolved at a concentration of 20 µM in an aqueous buffer containing 100 mM phosphate, 6 M guanidinium chloride, 20% glycerol, at pH 7.5. Sixteen identical 12×12 microarrays, each comprised of the 144 different *Saccharomyces cerevisiae* polypeptides, were printed onto "SuperAldehyde Slides" (from TeleChem International of Sunnyvale, Calif.) using a GMS417 microarrayer (from Affymetrix of Santa Clara, Calif.). The sixteen identical microarrays were prepared, with a spacing of 250 µm between the centers of adjacent spots and a spacing of 9 mm (i.e., the spacing of a 96-well microtiter plate) between the centers of adjacent microarrays. Following a one hour incubation, the slides were quenched with ethanol (10 seconds), rinsed with water, and dried by centrifugation. The slides were then attached to the bottom of a bottomless 96-well microtiter plate (Greiner #655000) as described in Example 2. Following attachment of the slides, the wells were each filled with 100 µl of phosphate buffered saline (PBS) supplemented with 1% (w/v) bovine serum albumin (BSA) and 0.02% (w/v) sodium azide and incubated at room temperature for one hour.

Probing with Cy3-Labeled Target Polypeptide

Prior to use, each well was rinsed 3 times with 150 µl of PBST (PBS supplemented with 0.1% (v/v) Tween-20) using a 96-channel pipetting robot (Beckman Coulter Biomek FX from Beckman Coulter of Fullerton, Calif.). Most of the PBST was removed using the pipetting robot and any remaining buffer removed by inverting the plates and centrifuging at 200 g for 30 seconds. 10 µl of labeled target polypeptide was then added to each well. The Cy3-labeled target polypeptide was present at a concentration of 1.2 µM in a buffer containing 100 mM phosphate, 6 M guanidinium chloride, and 6 mM dithiothreitol (DTT), at pH 7.5. At this point, both the immobilized protein probes and the solution-phase polypeptide target were denatured due to the high concentration of guanidinium chloride. The target and probes were simultaneously refolded in each other's presence by diluting the target with native buffer. 50 µl of refolding buffer (1.2×PBS, 1.2% BSA, 0.12% Tween-20) was added to each well using the pipetting robot and the solutions mixed by pipetting up and down 12 times. The microarrays were then incubated at room temperature for 30 minutes.

Washing and Scanning the Microarrays

The microarrays were washed in an automated fashion as follows. Using the pipetting robot, the solutions containing the Cy3-labeled target polypeptide were removed from the wells and discarded. 150 µl of PBST was added to each well and mixed by pipetting up and down 4 times. The wash solution was then discarded and the procedure repeated twice with 200 µl PBST and twice with 200 µl PBS. Residual buffer was then removed by inverting the plates and centrifuging at 200 g for 30 seconds. To visualize the microarrays, the plates were scanned using a fluorescence scanner that is able to sca microarrays in a microtiter plate format (Tecan LS-200 scanner from Tecan of Durham, N.C.). When the microarrays were incubated with a fluorescently labeled polypeptide probe that contained the coiled coil domain of tropomyosin I from *Saccharomyces cerevisiae*, a single bright spot was identified in each identical microarray (data not shown). The coiled coil domain of tropomyosin I from *Saccharomyces cerevisiae* is known to form a homodimer and the single bright spot corresponded to the position within each array of the unlabeled form of that same polypeptide.

Example 4

Figure 13:
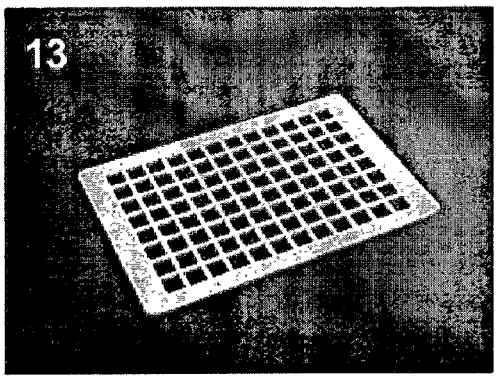
FIG. 13 depicts a series of photographs that compare the assembly of an inventive microtiter-microarray device that includes a 96-square well microtiter plate (Grace Bio-Labs #GR60102 from Grace Bio-Labs of Bend, Oreg., Panels 13–16) with the assembly of an inventive microtiter-microarray device that includes a 64-square well microtiter plate (Grace Bio-Labs #GR60105 from Grace Bio-Labs of Bend, Oreg., Panels 17–20).
Figure 13:
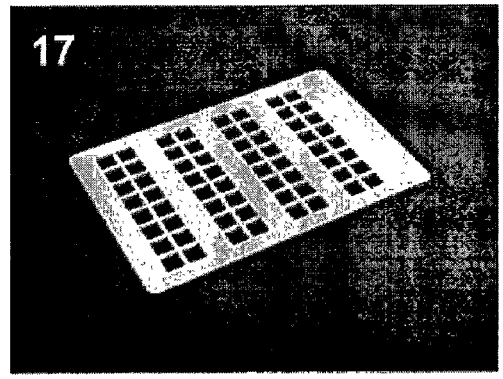
Figure 13:
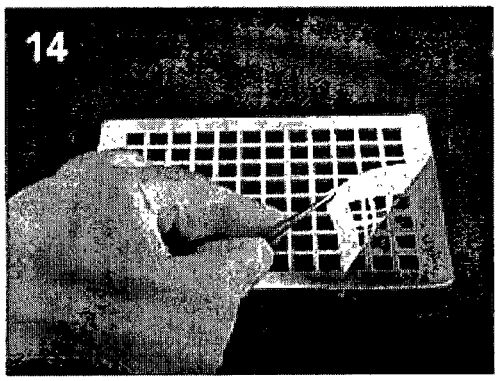
Figure 13:
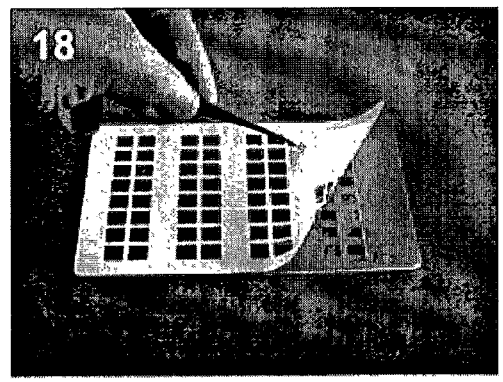
Figure 13:
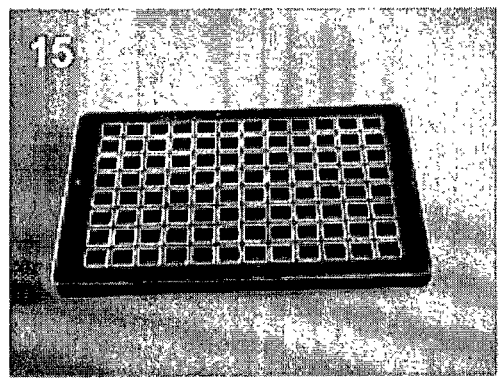
Figure 13:
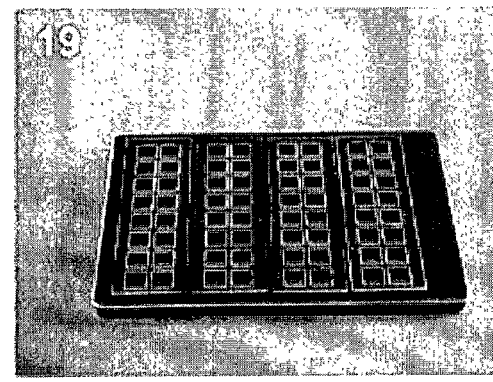
Figure 13:
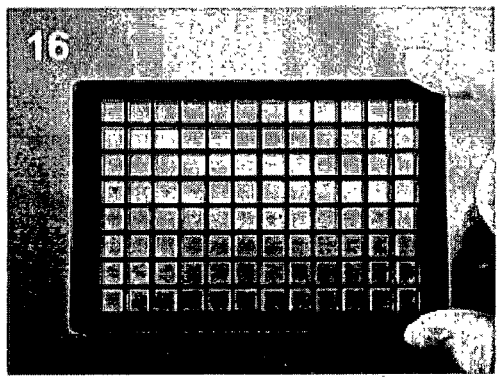
Figure 13:
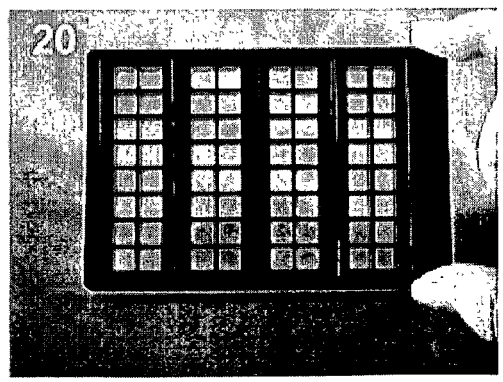

Example 4 describes an inventive process and devices that have been used to combine glass slides with a exemplary 96-well bottomless microtiter plate (Grace Bio-Labs #GR60102 and #GR60105). FIG. 13 compares the assembly of an inventive microtiter-microarray device that includes a 96-square well microtiter plate (Grace Bio-Labs #GR60102 from Grace Bio-Labs of Bend, Oreg., Panels 13–16) with the assembly of an inventive microtiter-microarray device that includes a 64-square well microtiter plate (Grace Bio-Labs #GR60105 from Grace Bio-Labs of Bend, Oreg., Panels 17–20). The former device was prepared using a gasket with an 8×12 microarray of perforations (Panels 13–16), while the latter device was prepared gasket with four 2×8 microarrays of perforations (Panels 17–20). In both cases, the microtiter plate was combined with four glass slides each with sixteen microarrays arranged in a 2×8 pattern. The comparison serves to illustrate that microarrays and microtiter plates may be combined in a variety of ways and that the present invention is in no way limited to a particular combination of microtiter plate, gasket, and glass slides.

Example 5

Figure 14:
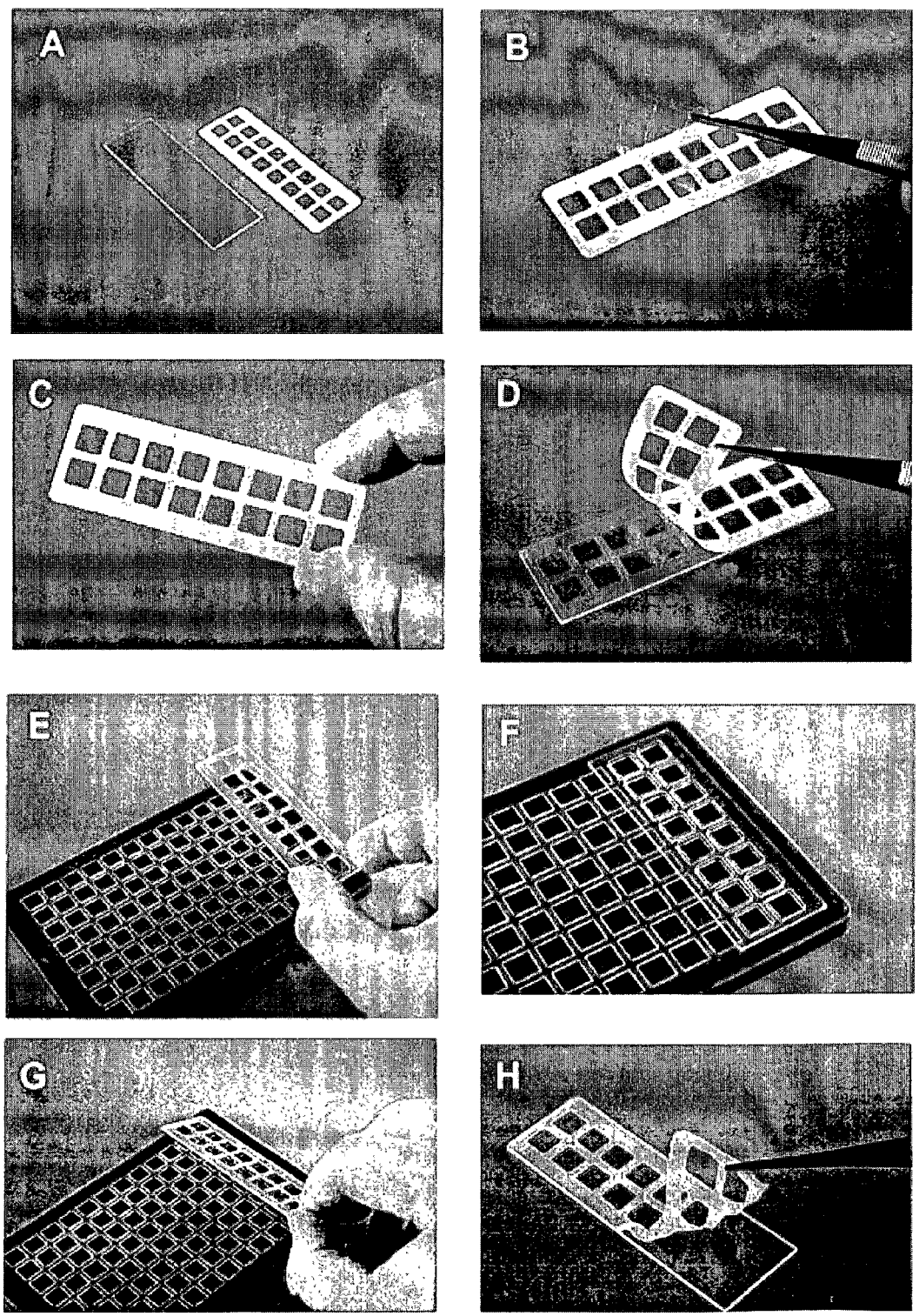
FIG. 14 depicts a series of photographs that were taken at different stages during the assembly of an inventive microtiter-microarray device that includes a 96-square well microtiter plate (Grace Bio-Labs #GR60102 from Grace Bio-Labs of Bend, Oreg.).

Example 4 describes another inventive process and devices that have been used to combine glass slides with the exemplary 96-well bottomless microtiter plate of Example 4 (Grace Bio-Labs#GR60102 from Grace Bio-Labs). A bottomless 96-well plate (Grace Bio-Labs#GR60102) was first combined with a 72.5 mm by 108.5 mm gasket with 96 square wells (plate gasket) (not shown). The exposed surface of the plate gasket is silicone. Referring to FIG. 14, a smaller 25.4 mm by 76.2 mm secondary gasket (slide gasket) was then die-cut from a piece of double-sided silicone/acrylic PSA (3M® #9731 from 3M). As shown in Panel A of FIG. 14, the exterior dimensions of the slide gasket match the exterior dimensions of a 25 mm by 75 mm glass slide. The spacing and size of the square perforations in the slide gasket matched those in the plate gasket. As shown in Panel B of FIG. 14, the release liner on the silicone adhesive side of the slide gasket was removed and the slide gasket was manually applied to the glass slide aligning the edges of the slide gasket with the edges of the glass slide such that the microarrays of material on the face of the glass slide were positioned within the perforations of the slide gasket. Pressure was then applied to the slide gasket by means of a roller to reversibly bond it to the glass slide. The resulting gasketed slide is shown in Panel C of FIG. 14. The release liner on the acrylic adhesive side of the slide gasket was then removed (Panel D of FIG. 14) and the gasketed slide was placed manually onto the silicone gasketed microtiter plate (Panel E of FIG. 14) by visually aligning the perforations of the slide gasket with the perforations of the plate gasket. It will be appreciated that the gasketed slide may alternatively have been placed onto the silicone gasketed microtiter plate using an inventive alignment device. Pressure was then applied to the bond to form an reversible, water-tight seal between the acrylic adhesive and the silicone surface of the plate gasket.

After the plates had been processed the slides were removed and scanned with conventional slide scanners. The slides were manually removed by slowly lifting the slides from the edge of the glass, allowing the silicone to release from the slide gasket. surface (Panel G of FIG. 14). Finally, the slide gasket was manually peeled off the glass slide (Panel H of FIG. 14).

Other Embodiments

Other embodiments of the invention will be apparent to those skilled in the art from a consideration of the specification or practice of the invention disclosed herein. It is intended that the specification and examples be considered as exemplary only, with the true scope of the invention being indicated by the following claims.

We claim:

1. A microtiter-microarray device comprising:
    a bottomless microtiter plate having a plurality of wells;
    one ore more gaskets having a first face, a second face, and a plurality of perforations; and
    one or more substrates having a first side with a plurality of predeposited microarrays of materials attached thereto, whereby the wells, the perforations, and the microarrays are arranged in identical patterns, the microtiter plate and the one or more substrates are attached through the one or more gaskets so that the plurality of wells, the plurality of perforations are aligned and sealingly joined to the one or more substrates to form an individual reaction chamber for each microarray.

2. The device of claim 1, wherein the microtiter plate is attached to the first face of the one or more gaskets by an irreversible, water-tight seal, and the first side of the one or more substrates is attached to the second face of the one or more gaskets by a reversible, water-tight seal.

3. The device of claim 1, wherein the microtiter plate is attached to the first face of the one or more gaskets by an irreversible, water-tight seal, and the first side of the one or more substrates is attached to the second face of the one or more gaskets by an irreversible, water-tight seal.

4. The device of claim 1, wherein the microtiter plate is attached to the first face of the one or more gaskets by a reversible, water-tight seal, and the first side of the one or more substrates is attached to the second face of the one or more gaskets by a reversible, water-tight seal.

5. The device of claim 1, wherein the microtiter plate and the one or more substrates are attached through a single gasket.

6. The device of claim 1, wherein the microtiter plate and the one or more substrates are attached through more than one gasket.

7. The device of claim 2, wherein the first face of the one or more gaskets comprises an irreversible adhesive and the second face of the one or more gaskets comprises a reversible adhesive.

8. The device of claim 3, wherein the first face of the one or more gaskets comprises an irreversible adhesive and the second face of the one or more gaskets comprises an irreversible adhesive.

9. The device of claim 4, wherein the first face of the one or more gaskets comprises a reversible adhesive and the second face of the one or more gaskets comprises an irreversible adhesive.

10. The device of any of claims 2–4, wherein the one or more gaskets comprise a 0.25 to 3mm thick layer of silicone.

11. The device of any of claims 2–4, wherein the one or more gaskets comprise one or more layers of a double-sided pressure-sensitive adhesive.

12. The device of any of claims 2–4, wherein the one or more gaskets comprise a 0.25 to 3mm thick layer of silicone arranged between two or more layers of a double-sided pressure-sensitive adhesive.

13. The device of claim 11, wherein the double-sided pressure-sensitive adhesive includes a permanent acrylic adhesive or a permanent silicone adhesive on one side.

14. The device of claim 11, wherein the double-sided pressure-sensitive adhesive includes a clean-release acrylic adhesive or a clean-release silicone adhesive on one side.

15. The device of claim 1, wherein the microtiter plate is a 96-well plate and the perforations of the one or more gaskets are in the pattern and dimensions of a 96-well plate.

16. The device of claim 1, wherein the microtiter plate is a 384-well plate and the perforations of the one or more gaskets are in the pattern and dimensions of a 384-well plate.

17. The device of claim 1, wherein the microtiter plate is a 1536-well plate and the perforations of the one or more gaskets are in the pattern and dimensions of a 1536-well plate.

18. The device of claim 1, wherein the microtiter plate is a 3456-well plate and the perforations of the one or more gaskets are in the pattern and dimensions of a 3456-well plate.

19. The device of claim 1, wherein the one or more substrates comprise microarrays of small molecules.

20. The device of claim 1, wherein the one or more substrates comprise microarrays of biomolecules.

21. The device of claim 1, wherein the one or more substrates comprise microarrays of proteins.

22. The device of claim 1, wherein the one or more substrates comprise microarrays of polynucleotides.

23. The device of claim 1, wherein the one or more substrates comprise microarrays of polyssaccharides.

24. The device of claim 1, wherein the one or more substrates comprise microarrays of whole cells or tissue samples.

25. The device of claim 1, wherein the one or more substrates are glass of plastic slides.

26. A method for preparing a microtiter-microarray device comprising:
providing a bottomless microtiter plate having a plurality of wells;
providing one or more gaskets having a first, a second face, and a plurality of perforations;
providing one or more substrates having a first face with a plurality of predeposited microarrays of materials attached thereto;
providing the wells, the perforations and the microarrays in identical patterns;
adhering the bottomless microtiter plate to the first face of the one or more gaskets so that the plurality of wells are aligned with the plurality of perforations; and
adhering the first side of the one or more substrates to the second face of the one or more gaskets so that the plurality of microarrays are aligned with the plurality of perforations.

27. The method of claim 26, whereby an irreversible, water-tight seal is formed between the first face of the one or more gaskets and the microtiter plate, and whereby a reversible, water-tight seal is formed between the first side of the one or more substrates and the second face of the one or more gaskets.

28. The method of claim 26, whereby an irreversible, water-tight seal is formed between the first face of the one or more gaskets and the microtiter plate, and whereby an irreversible, water-tight seal is formed between the first side of the one or more substrates and the second face of the one or more gaskets.

29. The method of claim 26, whereby a reversible, water-tight seal is formed between the first face of the one or more gaskets and the microtiter plate, and whereby a reversible, water-tight seal is formed between the first side of the one or more substrates and the second face of the one or more gaskets.

30. The method of claim 26, wherein the microtiter plate and the one or more substrates are attached through a single gasket.

31. The method of claim 26, wherein the microtiter plate and the one or more substrates are attached through more than one gasket.

32. The method of claim 27, wherein the first face of the one or more gaskets comprises an irreversible adhesive and the second face of the one or more gaskets comprises a reversible adhesive.

33. The method of claim 28, wherein the first face of the one or more gaskets comprises an irreversible adhesive and the second face of the one or more gaskets comprises an irreversible adhesive.

34. The method of claim 29, wherein the first face of the one or more gaskets comprises a reversible adhesive and the second face of the one or more gaskets comprises a reversible adhesive.

35. The method of any one of claims 32–34, wherein the one or more gaskets comprise a 0.25 to 3 mm thick layer of silicone.

36. The method of any one of claims 32–34, wherein the one or more gaskets comprise one or more layers of a double-sided pressure-sensitive adhesive.

37. The method of any one of claims 32–34, wherein the one or more gaskets comprise a 0.25 to 3 mm thick layer of silicone arranged between two or more layers of a double-sided pressure-sensitive adhesive.

38. The method of claim 36, wherein the double-sided pressure-sensitive adhesive includes a permanent acrylic adhesive or a permanent silicone adhesive on one side.

39. The method of claim 36, wherein the double-sided pressure-sensitive adhesive includes a clean-release acrylic adhesive or a clean-release silicone adhesive on one side.

40. The method of claim 36, wherein one or both sides of the layer of silicone have been treated with a chemical adhesion promoter or primer.

41. The method of claim 26, wherein the microtiter plate is a 96-well plate and the perforations of the one or more gaskets are in the pattern and dimensions of a 96-well plate.

42. The method of claim 26, wherein the microtiter plate is a 384-well plate and the perforations of the one or more gaskets are in the pattern and dimensions of a 384-well plate.

43. The method of claim 26, wherein the microtiter plate is a 1536-well plate and the perforations of the one or more gaskets are in the pattern and dimensions of a 1536-well plate.

44. The method of claim 26, wherein the microtiter plate is a 3456-well plate and the perforations of the one or more gaskets are in the pattern and dimensions of a 3456-well plate.

45. The method of claim 26, wherein the one or more substrates comprise microarrays of small molecules.

46. The method of claim 26, wherein the one or more substrates comprise microarrays of biomolecules.

47. The method of claim 46, wherein the one or more substrates comprise microarrays of proteins.

48. The method of claim 46, wherein the one or more substrates comprise microarrays of polynucleotides.

49. The method of claim 46, wherein the one or more substrates comprise microarrays of polysaccharides.

50. The method of claim 26, wherein the one or more substrates comprise microarrays of whole cells or tissue samples.

51. The method of claim 26, wherein the step of adhering the bottomless microtiter plate to the first face of the one or more gaskets further comprises first aligning the one or more gaskets with the microtiter plate so that the plurality of wells are aligned with the plurality of perforations.

52. The method of claim 51, further comprising the step of aligning the one or more gaskets with the microtiter plate using a first aligning device.

53. The method of claim 52, wherein the step of aligning further comprising the steps of:
    forming the first aligning device of a rigid material with a plurality of protrusions that are dimensioned and arranged to fit within the perforations of the one or more gaskets; and
    placing the one or more gaskets over the plurality of protrusions so that the protrusions fit within the perforations of the one or more gaskets.

54. The method of claim 53, wherein the protrusions are taller than the one or more gaskets are thick, and whereby the step of aligning the one or more gaskets with the microtiter plate further comprises placing the microtiter plate over the plurality of protrusions after the one or more gaskets have been placed so that the protrusions also fit within the wells of the microtiter plate.

55. The method of claim 53, wherein the first aligning device further comprises one or more features that are dimensioned and arranged to accommodate or fit within one or more complementary features of the microtiter plate, and whereby the step of aligning the one or more gaskets with the microtiter plate further comprises placing the microtiter plate over the first aligning device after the one or more gaskets have been placed so that the complementary features are aligned.

56. The method of claim 26, wherein the step of adhering the first side of the one or more substrates to the second face of the one or more gaskets further comprises first aligning the one or more substrates with the microtiter plate having one or more gaskets attached thereto so that the plurality of microarrays and the plurality of perforations are aligned.

57. The method of claim 56, wherein the one or more substrates are aligned with the microtiter plate having one or more gaskets attached thereto using a second aligning device.

58. The method of claim 57, wherein the second aligning device comprises a rigid material comprising one or more casings, each casing surrounded by four walls, wherein the dimensions of the casings comprise the dimensions of the substrates, and whereby the step of aligning the one or more substrates with the microtiter plate having one or more gaskets attached thereto comprises placing the one or more substrates over the one or more casings so that the one or more substrates fit within the one or more casings.

59. The method of claim 58, wherein the second aligning device further comprises one or more features that are dimensioned and arranged to accommodate or fit within one or more complementary features of the microtiter plate, and whereby the step of aligning the one or more substrates with the microtiter plate having one or more gaskets attached thereto further comprises placing the microtiter plate having one or more gaskets attached thereto over the second aligning device after the one or more substrates have been placed so that the complementary features are aligned.

* * * * *